United States Patent
Ha

(10) Patent No.: US 11,113,552 B2
(45) Date of Patent: Sep. 7, 2021

(54) ELECTRONIC DEVICE AND METHOD FOR DISPLAYING IMAGE FOR IRIS RECOGNITION IN ELECTRONIC DEVICE

(71) Applicant: Samsung Electronics Co., Ltd., Gyeonggi-do (KR)

(72) Inventor: Seung-Tae Ha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 174 days.

(21) Appl. No.: 15/828,263

(22) Filed: Nov. 30, 2017

(65) Prior Publication Data
US 2018/0150709 A1    May 31, 2018

(30) Foreign Application Priority Data
Nov. 30, 2016   (KR) ......................... 10-2016-0161426

(51) Int. Cl.
*G06K 9/00* (2006.01)
*H04N 5/232* (2006.01)
(Continued)

(52) U.S. Cl.
CPC ..... *G06K 9/00912* (2013.01); *G06K 9/00604* (2013.01); *G06K 9/00617* (2013.01);
(Continued)

(58) Field of Classification Search
CPC .. G06K 9/00912; G06K 9/22; G06K 9/00617; G06K 9/00604; H04N 5/232939;
(Continued)

(56) References Cited

U.S. PATENT DOCUMENTS

| 7,369,759 B2* | 5/2008 | Kusakari | A61B 5/1171 |
| | | | 396/18 |
| 10,068,079 B2* | 9/2018 | Lee | G06F 21/32 |

(Continued)

FOREIGN PATENT DOCUMENTS

| CN | 101971128 A | 2/2011 |
| CN | 103024338 A | 4/2013 |

(Continued)

OTHER PUBLICATIONS

ISA/KR, "International Search Report and Written Opinion of the International Searching Authority," International Application No. PCT/KR2017/013945, dated Mar. 7, 2018, 10 pages.
(Continued)

*Primary Examiner* — Richard A Hansell, Jr.

(57) ABSTRACT

Disclosed are various embodiments related to iris authentication technology for electronic devices. According to an embodiment of the present disclosure, an electronic device may include a camera, a display, and a processor configured to display a first image on the display when a distance between the electronic device and an object included in an image captured by the camera is a first distance and to display a second image associated with the first image on the display when the distance between the electronic device and the object included in the image captured by the camera is a second distance different from the first distance. Other various embodiments are also available.

12 Claims, 33 Drawing Sheets

(51) Int. Cl.
- *G06K 9/22* (2006.01)
- *H04N 5/225* (2006.01)
- *H04N 5/235* (2006.01)
- *H04N 5/33* (2006.01)

(52) U.S. Cl.
CPC ............. *G06K 9/22* (2013.01); *H04N 5/2258* (2013.01); *H04N 5/2351* (2013.01); *H04N 5/23219* (2013.01); *H04N 5/23222* (2013.01); *H04N 5/23293* (2013.01); *H04N 5/232939* (2018.08); *H04N 5/33* (2013.01); *H04N 5/23258* (2013.01)

(58) Field of Classification Search
CPC .......... H04N 5/23222; H04N 5/23219; H04N 5/2258; H04N 5/2351; H04N 5/23293; H04N 5/33; H04N 5/23258
See application file for complete search history.

(56) References Cited

U.S. PATENT DOCUMENTS

| | | | | |
|---|---|---|---|---|
| 2002/0106113 A1* | 8/2002 | Park | ................. | G06K 9/00597 382/117 |
| 2008/0192129 A1* | 8/2008 | Walker | ................. | G11B 27/34 348/231.2 |
| 2009/0002478 A1* | 1/2009 | Ueki | ................. | H04N 5/23248 348/14.01 |
| 2009/0207251 A1* | 8/2009 | Kobayashi | ......... | G06K 9/00597 348/156 |
| 2010/0201709 A1 | 8/2010 | Yang et al. | | |
| 2011/0055774 A1* | 3/2011 | Kim | ................. | G06F 3/017 715/863 |
| 2011/0102320 A1 | 5/2011 | Hauke et al. | | |
| 2012/0256820 A1 | 10/2012 | Uppuluri et al. | | |
| 2013/0015946 A1* | 1/2013 | Lau | ................. | G06F 21/32 340/5.2 |
| 2013/0155474 A1* | 6/2013 | Roach | ................. | G06Q 20/14 358/505 |
| 2013/0293457 A1 | 11/2013 | Yoon | | |
| 2013/0301886 A1* | 11/2013 | Koda | ................. | G06K 9/00288 382/118 |
| 2014/0232648 A1* | 8/2014 | Park | ................. | G06F 3/0483 345/156 |
| 2015/0098630 A1* | 4/2015 | Perna | ................. | G07C 9/00563 382/117 |
| 2015/0112633 A1* | 4/2015 | Lee | ................. | G01P 13/00 702/141 |
| 2016/0110601 A1* | 4/2016 | Son | ................. | H04N 5/23293 382/117 |
| 2016/0125221 A1 | 5/2016 | Kim et al. | | |
| 2016/0267319 A1* | 9/2016 | Murillo | ............. | G06K 9/00604 |
| 2016/0371812 A1* | 12/2016 | Tsukamoto | ........ | G06K 9/00604 |
| 2018/0046423 A1* | 2/2018 | Abraham | ................ | G06F 3/013 |

FOREIGN PATENT DOCUMENTS

| | | | | |
|---|---|---|---|---|
| CN | 103106401 A | | 5/2013 | |
| CN | 105324781 A | | 2/2016 | |
| CN | 105528573 A | | 4/2016 | |
| EP | 2515526 A2 | * | 10/2012 | ........... H04N 5/2226 |
| EP | 2515526 A2 | | 10/2012 | |
| EP | 2685704 A1 | * | 1/2014 | ....... H04N 5/232935 |
| EP | 3014520 B1 | * | 11/2019 | ......... G06K 9/00617 |
| JP | 2011002988 A | * | 1/2011 | |
| KR | 10-2006-0079941 A | | 7/2006 | |
| KR | 20060079941 A | * | 7/2006 | |
| KR | 100617659 A1 | | 8/2006 | |
| KR | 100634666 B1 | | 10/2006 | |
| KR | 20100090467 A | * | 8/2010 | ....... H04N 21/42202 |
| KR | 10-2011-0024454 A | | 3/2011 | |
| KR | 20110024454 A | * | 3/2011 | ........ H04M 1/72412 |
| KR | 20110136070 A | | 12/2011 | |
| KR | 10-1547556 B1 | | 8/2015 | |
| KR | 101548624 A1 | | 9/2015 | |
| KR | 10-2016-0044403 A | | 4/2016 | |
| KR | 20160044403 A | | 4/2016 | |
| WO | 2014/208052 A1 | | 12/2014 | |

OTHER PUBLICATIONS

Supplementary Partial European Search Report dated Jun. 24, 2019 in connection with European Patent Application No. 17 87 7023, 15 pages.
Notification of the First Office Action in connection with Chinese Application No. 201780073735.9 dated Jun. 2, 2020, 21 pages.
Office Action dated Feb. 23, 2021 in connection with Chinese Patent Application No. 201780073735.9, 24 pages.

* cited by examiner

ELECTRONIC DEVICE AND METHOD FOR DISPLAYING IMAGE FOR IRIS RECOGNITION IN ELECTRONIC DEVICE

CROSS-REFERENCE TO RELATED APPLICATION AND CLAIM OF PRIORITY

This application is related to and claims priority to Korean Patent Application No. 10-2016-0161426 filed on Nov. 30, 2016, the contents of which are incorporated herein by reference.

TECHNICAL FIELD

Various embodiments of the present disclosure relate to electronic devices and iris recognition in electronic devices.

BACKGROUND

Recently being developed are electronic devices equipped with diverse capabilities, e.g., photographing or video taking and Internet communication, as well as mere phone functionality. Thus, personal security issues are a growing concern. Protecting personal information is critical particularly in use of electronic devices that come with, e.g., online payment functionality, that may seriously harm the user when misused by thieves. Living up to increased demand for a higher level of security for electronic devices, electronic devices are equipped with various security schemes to restrict use by others.

Biological features may be used to identify the user for security purposes, and research is underway on security technology using various biometric information, e.g., fingerprint, voice, retina, face, or iris. The shape of iris, among others, differs from person to person and, by the nature of a less chance of being copied or changed over one's entire life, draws more attention for use in security techniques.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an iris recognition scheme adopted for electronic devices as follows. A preview screen is obtained by capturing the user's face or eye using the camera and displayed on the display. The user then fits his eye to the iris-recognizable position while viewing the preview screen.

This scheme requires that high-resolution images captured by the camera be continuously delivered to the display to provide the preview screen. Thus, the electronic device may suffer from a deterioration of performance upon iris recognition. Moreover, the continuous display of the user's face or eye images may displease the user. If the camera is an infrared (IR) camera, the camera produces black-and-white images with only brightness components on the preview screen, failing to giving a better result in light of aestheticism. Further, since an image including the user's face, eye or iris is displayed on the preview, the user's iris information may be leaked out without his intention.

The electronic device may provide a feedback message saying "Too close. Please stay further away from camera" on the preview screen when the user positions his eye closer than the iris recognizable position and a feedback message saying "Too far. Please come closer to the camera" when the user positions his eye farther away than the iris recognizable position.

Where feedback messages are provided in such a way, however, swift iris alignment may be difficult and intuitiveness may be deteriorated because the user interprets the text and accordingly takes an action. Further, providing a feedback message in text cannot give an intuitive awareness as to how close or far the user needs to position his eye. Thus, the user may not readily figure out a proper distance for iris recognition.

According to an embodiment of the present disclosure, there may be provided an electronic device and a method for iris recognition in the electronic device, wherein iris recognition may be guided using an image corresponding to the user's eye or iris even without steadily displaying the user's face or eye on the preview screen, preventing the user's eye or iris information from leaking out while presenting aesthetic effects.

According to an embodiment of the present disclosure, there may be provided an electronic device and a method for iris recognition in the electronic device, wherein the user may intuitively recognize a distance appropriate for iris recognition and quickly position his eye to the iris-recognizable distance.

According to an embodiment of the present disclosure, an electronic device may include a camera, a display, and a processor configured to display a first image on the display when a distance between the electronic device and an object included in an image captured by the camera is a first distance and to display a second image associated with the first image on the display when the distance between the electronic device and the object included in the image captured by the camera is a second distance different from the first distance.

According to an embodiment of the present disclosure, a method for displaying an image for iris recognition in an electronic device may comprise displaying a first image on a display when a distance between the electronic device and an object included in an image captured by a camera is a first distance and displaying a second image associated with the first image on the display when the distance between the electronic device and the object included in the image captured by the camera is a second distance different from the first distance.

According to an embodiment of the present disclosure, there is provided a storage medium storing a program, wherein the program may display a first image on a display when a distance between an electronic device and an object included in an image captured by a camera is a first distance in the electronic device and display a second image associated with the first image on the display when the distance between the electronic device and the object included in the image captured by the camera is a second distance different from the first distance.

According to an embodiment of the present disclosure, an electronic device may comprise a housing including a first surface, a second surface positioned opposite the first surface, and a side surface surrounding a space between the first surface and the second surface, a touchscreen display exposed through a first portion of the first surface, a proximity sensor exposed through a second portion of the first surface, an iris detection sensor exposed through a third portion of the first surface, a processor electrically connected with the display, the proximity sensor, and the iris detection sensor, and a memory electrically connected with the processor, wherein the memory may store instructions executed to enable the processor to receive a first user input, display a graphic user interface on the display after receiving the first user input, activate the proximity sensor, receive data from the proximity sensor, and vary a clarity of the graphic user interface based on at least part of the data to guide a user's eye to be within a selected distance range from the first surface, and wherein the clarity may be maximized when the user's eye is positioned within the selected distance range.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
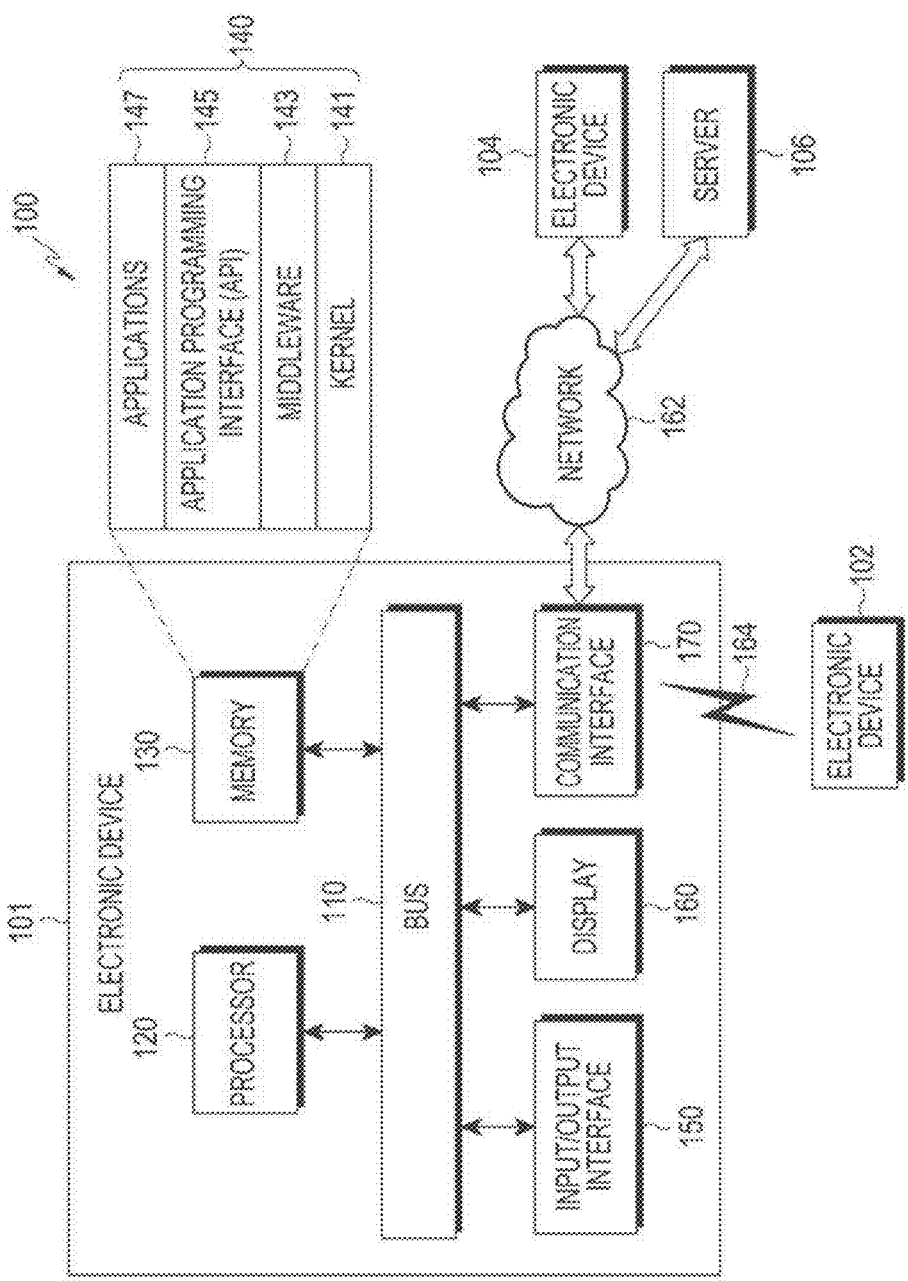
FIG. 1 illustrates a block diagram of a network environment including an electronic device according to an embodiment of the present disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to an embodiment of the present disclosure, an electronic device 100 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
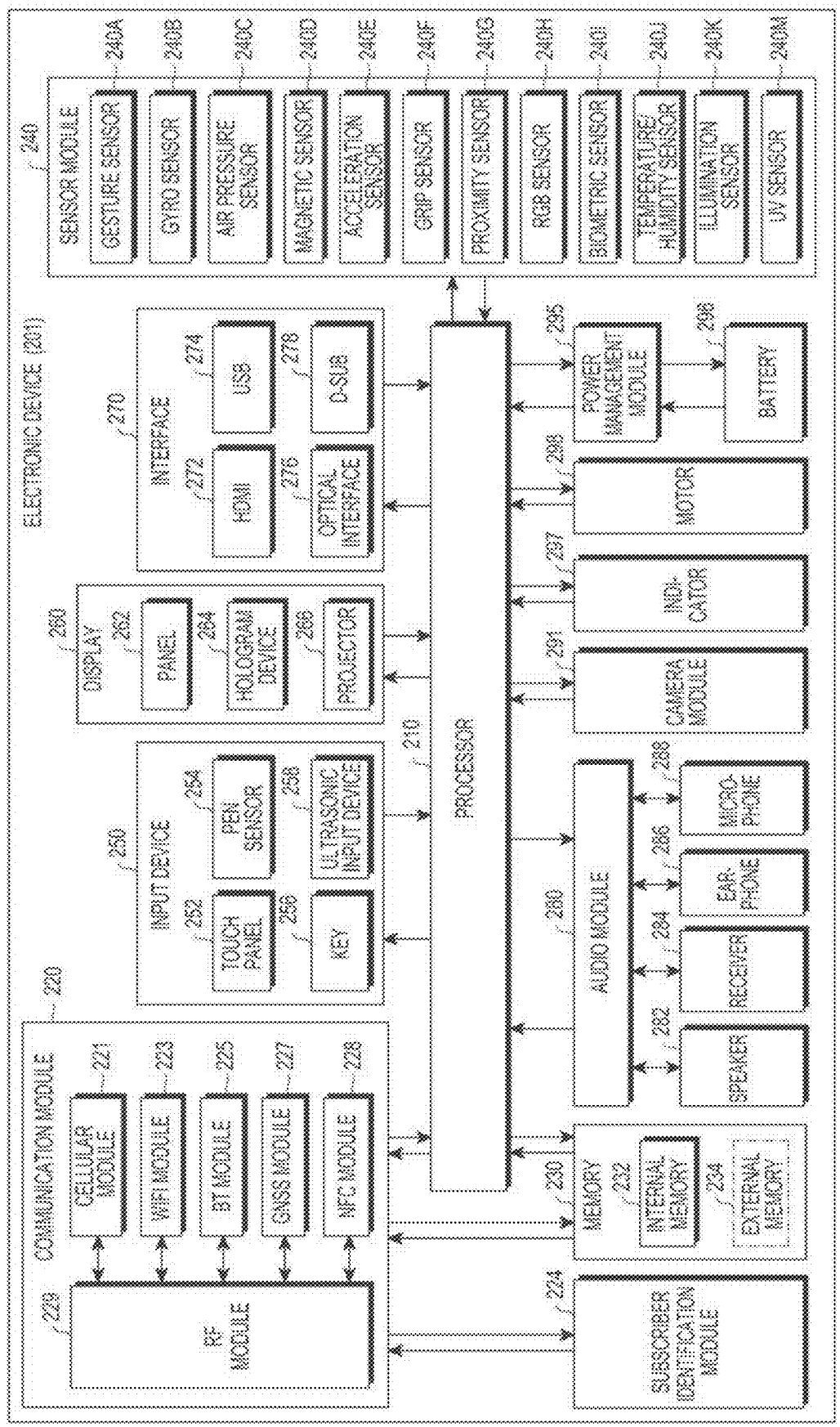
FIG. 2 illustrates a block diagram of an electronic device according to an embodiment of the present disclosure.

FIG. 2 is a block diagram illustrating an electronic device according to an embodiment of the present disclosure.

The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer to provide an immediate reaction to the user. The (digital) pen sensor 254 may include, e.g., part of the touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
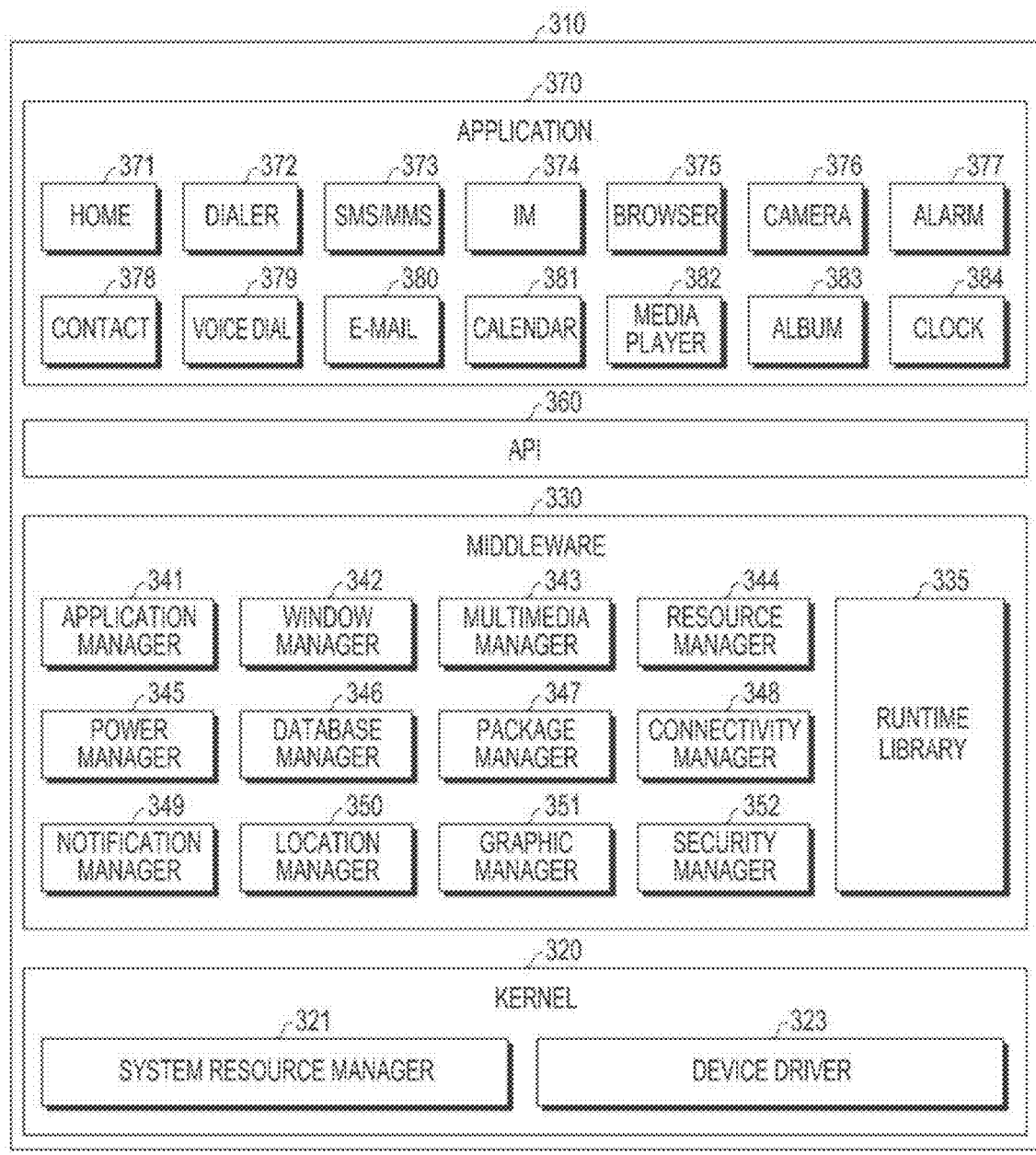
FIG. 3 illustrates a block diagram of a program module according to an embodiment of the present disclosure.

FIG. 3 is a block diagram illustrating a program module according to an embodiment of the present disclosure;

According to an embodiment of the present disclosure, the program module 310 (e.g., the program 140) may include an operating system (OS) controlling resources related to the electronic device (e.g., the electronic device 101) and/or various applications (e.g., the application processor 217) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

According to an embodiment of the present disclosure, an electronic device may include a camera, a display, and a processor configured to display a first image on the display when a distance between the electronic device and an object included in an image captured by the camera is a first distance and to display a second image associated with the first image on the display when the distance between the electronic device and the object included in the image captured by the camera is a second distance different from the first distance.

According to an embodiment of the present disclosure, the electronic device may further comprise a storage unit for storing a first iris image. The processor may be configured to perform authentication using the first iris image and the object included in the captured image when the distance between the electronic device and the object included in the image captured by the camera is a distance within an iris-recognizable range.

According to an embodiment of the present disclosure, the storage unit may further store a plurality of images. The processor may be configured to display a first image selected corresponding to the first distance among the plurality of images when the distance between the object and the electronic device is the first distance and a second image selected corresponding to the second distance among the plurality of images when the distance between the object and the electronic device is the second distance.

According to an embodiment of the present disclosure, the second image may be varied according to the second distance.

According to an embodiment of the present disclosure, the second image may be obtained by varying at least one or more of a shape, clarity, transparency, brightness, color, or object size of the first image to make a difference between the first distance and the second distance.

According to an embodiment of the present disclosure, the electronic device may further comprise an acceleration sensor for sensing a shake of the electronic device. The processor may be configured to perform a process to provide an effect corresponding to the sensed shake to the second image corresponding to the sensed shake and to display a third image processed to present the effect corresponding to the sensed shake.

According to an embodiment of the present disclosure, the electronic device may further comprise an illuminance sensor sensing an illuminance. The processor may be configured to perform a process to provide an effect corresponding to the sensed illuminance to the second image corresponding to the sensed illuminance and to display a fourth image processed to present the effect corresponding to the sensed illuminance.

According to an embodiment of the present disclosure, the processor may be configured to sense a motion of the electronic device using the acceleration sensor, perform a process to provide an effect corresponding to the sensed motion to the second image corresponding to the sensed motion, and display a fifth image processed to present the effect corresponding to the sensed motion.

According to an embodiment of the present disclosure, when iris recognition is requested, the processor may be configured to further display a guide image for guiding where an eye is to be positioned on the display.

According to an embodiment of the present disclosure, the processor may be configured to determine an age of an object obtained by the camera and display the first image and the second image based on a result of the determination.

According to an embodiment of the present disclosure, the processor may be configured to reduce a strength or time of infrared (IR) light emission of the camera when the age of the object corresponds to a kids mode.

According to an embodiment of the present disclosure, an electronic device may comprise a housing including a first surface, a second surface positioned opposite the first surface, and a side surface surrounding a space between the first surface and the second surface, a touchscreen display exposed through a first portion of the first surface, a proximity sensor exposed through a second portion of the first surface, an iris detection sensor exposed through a third portion of the first surface, a processor electrically connected with the display, the proximity sensor, and the iris detection sensor, and a memory electrically connected with the processor, wherein the memory may store instructions executed to enable the processor to receive a first user input, display a graphic user interface on the display after receiving the first user input, activate the proximity sensor, receive data from the proximity sensor, and vary a clarity of the graphic user interface based on at least part of the data to guide a user's eye to be within a selected distance range from the first surface, and wherein the clarity may be maximized when the user's eye is positioned within the selected distance range.

According to an embodiment of the present disclosure, the instructions may enable the processor to capture an iris image using the iris detection sensor only when the clarity is maximized.

According to an embodiment of the present disclosure, the instructions may enable the processor to automatically capture an iris image using the iris detection sensor when the clarity is maximized.

According to an embodiment of the present disclosure, the instructions may enable the processor to gradually vary the clarity of the graphic user interface based on at least part of the data.

According to an embodiment of the present disclosure, the graphic user interface may include at least one of a letter, a symbol, an image, a picture, or a video.

According to an embodiment of the present disclosure, the picture or the video may include an image of the user's eye captured by the iris detection sensor.

According to an embodiment of the present disclosure, the proximity sensor may be disposed near a first edge of the display, and the iris detection sensor may be disposed on the same side as the proximity sensor on the display.

Figure 4:
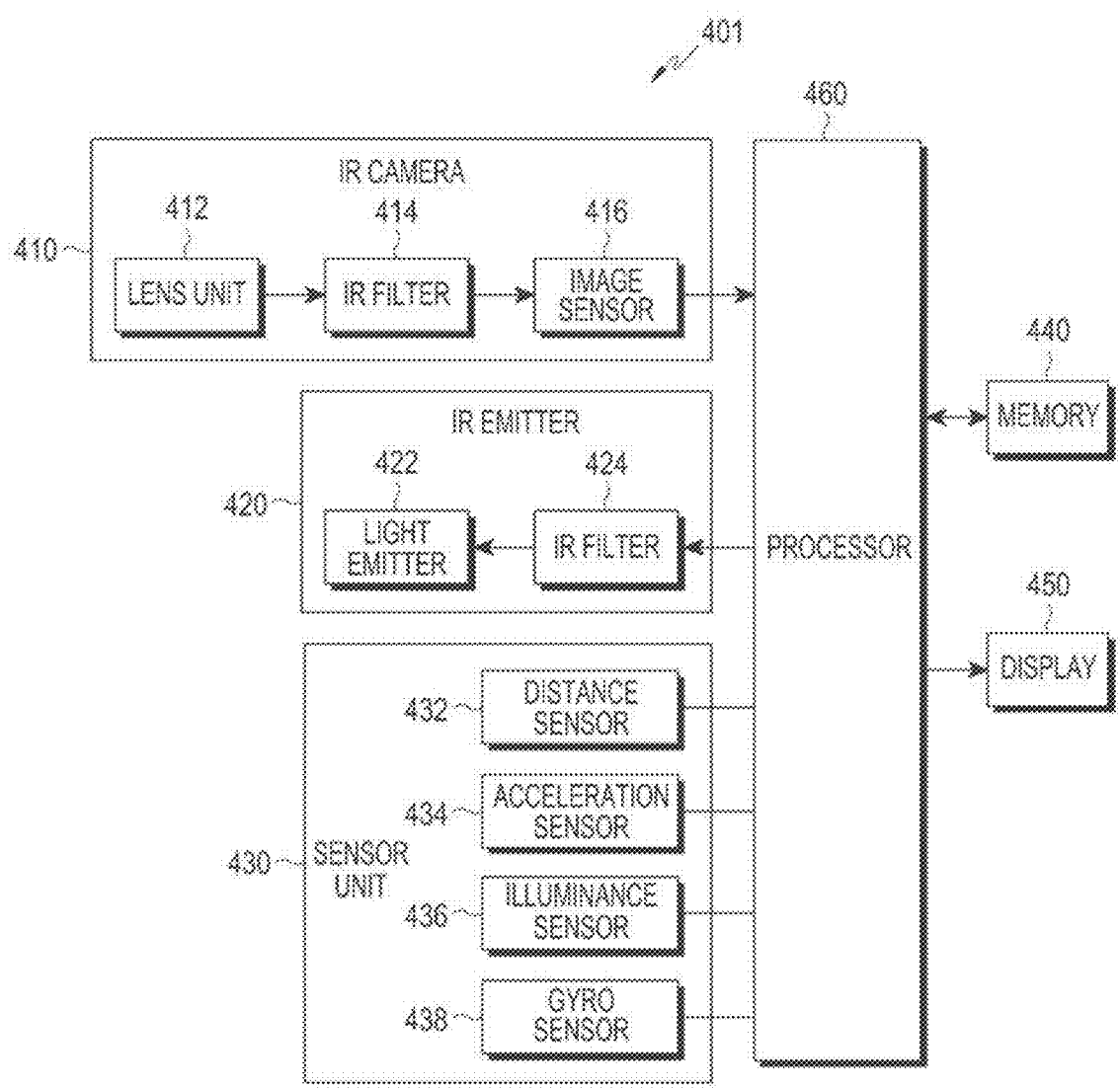
FIG. 4 illustrates a block diagram of an electronic device for displaying an image for iris recognition according to an embodiment of the present disclosure.

FIG. 4 is a block diagram illustrating an electronic device for displaying an image for iris recognition according to an embodiment of the present disclosure.

Referring to FIG. 4, an electronic device 401 may include an infrared (IR) camera 410, an IR emitter 420, a sensor unit 430, a memory 440, a display 450, or a processor 460.

According to an embodiment of the present disclosure, the IR camera 410 may include a lens unit 412, an IR filter 414, or an image sensor 416. The IR camera 410 may process an iris image obtained for iris recognition under the control of the processor 460 or independent from the processor 460 and provide the processed iris image to the processor 460. For example, when an iris recognition mode is set under the control of the processor 460, the IR camera 410 may generate an image which is obtained by capturing a target, e.g., the user's face or eye, using the image sensor 416 and detect an object (e.g., an eye image or face image including at least part of the user's iris) from the generated image.

According to an embodiment of the present disclosure, the lens unit 412 of the IR camera 410 may adjust the focus of the lens to a preset value in response to a capturing control signal by the processor 460 and transmit an optical signal that is reflected from the target (not shown). The lens unit 412 may receive light for input of the user's iris. The light incident onto the lens unit 412 may reach a band pass filter. For example, the IR filter 414 may correspond to the band pass filter.

According to an embodiment of the present disclosure, the IR filter 414 may pass an IR spectrum of optical signal of optical signals that is incident through the lens unit 412 and reflected from the target (not shown). The IR filter 414 may be placed downstream of the lens to pass a particular wavelength of light of the incident light. The IR filter 414 may correspond to a particular wavelength band including at least part of a wavelength band of light emitted through the IR emitter 420. For example, the optical signal with the particular wavelength band which has passed through the IR filter 414 may reach the image sensor 416. According to an embodiment of the present disclosure, the IR camera 410 may not include the IR filter 414. Light emitted from the IR emitter 420 may be reflected on the iris and may come through the lens unit 412 of the camera module directly to the image sensor 416.

According to an embodiment of the present disclosure, upon normal capture, the image sensor 416 may convert the optical signal which is received through the lens unit 412 into image signals and output the image signals. Upon IR capture, the image sensor 416 may convert the IR band of optical signal which has passed through the IR filter 414 of the optical signals which are received through the lens unit 412 into IR image signals and output the IR image signals. The image sensor 416 may convert the optical image formed by the IR ray reflected from the target into a digital image and output the digital image. The IR camera 410 may be placed in the electronic device 401 or may be placed in an independent position which is not in the electronic device 401.

According to an embodiment of the present disclosure, the IR emitter (e.g., an IR emitting diode) 420 may switch on or off in response to an IR capturing control signal by the processor 460. The IR emitter 420, when switching on, may radiate a particular wavelength band of light, e.g., IR band of light, to the target. The IR capturing control signal may be a signal for capturing an IR picture for the iris.

According to an embodiment of the present disclosure, the sensor unit 430 may measure a physical quantity or detect an operational stage of the electronic device 401, and the sensor unit 430 may convert the measured or detected information into an electrical signal. The sensor unit 430 may include a distance sensor 432, an acceleration sensor 434, an illuminance sensor 436, or a gyro sensor 438.

According to an embodiment of the present disclosure, the distance sensor 432 may perform detection or metering to measure the distance between the electronic device 401 and an object (e.g., the user's face, eye, or iris) in a captured image. For example, the distance sensor 432 may emit light to the target using an IR LED and detect the amount of light reflected from the target, performing detection or metering to measure the distance between the electronic device 401 and the object in the captured image. The distance sensor 432 may emit an ultrasonic wave or laser beam to the target using an ultrasound sensor or laser sensor and detect the ultrasonic wave or laser beam reflected from the target, performing detection or metering to measure the distance between the electronic device 401 and the object in the captured image. The acceleration sensor 434 may sense an acceleration or the strength of an impact by the motion of the electronic device 401. The illuminance sensor 436 may sense the illuminance of the surroundings of the electronic device 401. The gyro sensor 438 may sense an angular speed as the electronic device 401 rotates.

According to an embodiment of the present disclosure, the sensor unit 430 may include a control circuit to control at least one or more sensors. According to an embodiment of the present disclosure, the electronic device 401 may include a processor configured to control the sensor unit 401 as part of the processor 460 or separately from the processor 460, and the electronic device 401 may control the sensor unit 430 while the processor 460 is in a sleep mode.

According to an embodiment of the present disclosure, the memory 440 may include at least one user's iris information. For example, the iris information may include an iris image obtained per user. For example, the memory 440 may store the user's first iris image for use in iris recognition. The iris image may be stored in the form of a feature pattern. The feature pattern may be the whole or, at least, part of an entire feature pattern of the iris image. The memory 440 may store an iris information conversion algorithm to convert the per-user iris image into a feature pattern, such as an iris code or template. The memory 440 may provide data which is a reference for comparison upon iris recognition and store an algorithm for such comparison.

According to an embodiment of the present disclosure, the memory 440 may store a first image to be displayed corresponding to a first distance between the electronic device and an object included in an image captured by the camera. The first distance may be a distance within which iris recognition is possible and may be a distance between the electronic device and an object for which iris recognition is possible. According to an embodiment of the present disclosure, the iris recognizable distance may be a particular distance or a predetermined distance interval within iris recognition is possible.

According to an embodiment of the present disclosure, the memory 440 may store a second image to be displayed corresponding to a second distance between the electronic device and an object included in an image captured by the camera. The second distance may be different from the first distance. For example, the second distance may be a distance between the electronic device and an object for which iris recognition is not possible. The second image may be an image associated with, e.g., the first image. The second image may be an image obtained by varying at least one or more of the shape, clarity, transparency, brightness, color, or object size of the first image to make a difference between the first distance and the second distance. The memory 440 may store a plurality of different second images.

According to an embodiment of the present disclosure, the display 450 may include, e.g., a touchscreen and may provide a user interface screen for iris recognition. For example, the display 450 may display a screen for iris recognition under the control of the processor 460. The display 450 may display a first image or a second image on the screen for iris recognition under the control of the processor 460.

According to an embodiment of the present disclosure, the display 450 may display an image based on the distance between the electronic device and the object under the control of the processor 460. For example, the display 450 may display the first image when the distance between the electronic device and the object included in the image captured under the control of the processor 460 is the first distance. For example, when the distance between the electronic device and the object included in the captured image is a particular first distance within iris recognition is possible or a first distance that belongs to a predetermined interval within iris recognition is possible, the display 450 may display the first image. When the distance between the electronic device and the object included in the image captured under the control of the processor 460 is the second distance which is different from the first distance, the display 450 may display the second image.

According to an embodiment of the present disclosure, the display 450 may display a guide image for guiding the position where the eye is to be positioned on the screen for iris recognition and may then display the first image or second image. When the iris recognition is complete under the control of the processor 460, the display 450 may display an iris recognition result screen. When the iris recognition is successful, the electronic device may perform functions, such as unlocking, running an application, or data transmission. The display 450 may display a screen according to the performing of the function under the control of the processor 460.

According to an embodiment of the present disclosure, the processor 460 may activate an iris recognition processor according to a user input or a predetermined iris recognition process activation condition. The processor 460 may determine, e.g., a user mode, and determine whether the iris recognition process is active depending on the type of user mode. Upon determining that the iris recognition process is inactive, the processor 460 may instead activate other authentication function (e.g., fingerprint, face, or password recognition). For example, where the widget user experience (UX) or user interface (UI) for infants or kids is chosen as a kids mode or a function or application requesting authentication is determined to be one for infants/kids through settings, the processor 460 may activate an authentication process that is safer or easier to use than the iris recognition process instead of the iris recognition process.

According to an embodiment of the present disclosure, the processor 460 may determine the user's age group using user age group information stored in association with a program (e.g., a function or application) installed on the electronic device 401 and determine whether the user mode is the kids mode or a normal mode using the determined user age group. The processor 460 may determine the user age group using, e.g., the age rating of the content (e.g., video or audio) running on the electronic device 401 and may determine whether the user mode is the kids mode or normal mode using the determined user age group.

According to an embodiment of the present disclosure, the electronic device 401 may measure the age through various sensors before performing the iris recognition process, determine the user's aging group using the measured value, and determine whether the user mode is the kids mode or normal mode using the determined user age group. For example, the electronic device 401 may analyze a voice signal received through the microphone, determining whether the user's age group falls within infants or kids or determining the user's gender. As another example, a normal camera may be driven to capture an image including the user's face, and the captured face image may be analyzed to determine the user's age group.

According to an embodiment of the present disclosure, the processor 460 may receive an image captured by the IR camera 410 when the iris recognition process is activated. The processor 460 may receive various sensor values sensed by the sensor unit 430. The processor 460 may detect an object (e.g., the user's eye or iris) in the captured image.

According to an embodiment of the present disclosure, the processor 460 may determine the distance between the electronic device and the object in the captured image based on the captured image or received sensor values. For example, the processor 460 may determine the distance between the camera and the eye in the captured image using the eye-to-eye distance (e.g., the distance between the left and right eyes) and the size of the facial portion in the captured image. The processor 460 may detect a phase difference as per the time difference of a light reflection using, e.g., a time-of-flight (TOF) sensor, and determine the distance between the camera and the eye in the captured image using the detected phase difference of light. The processor 460 may determine the distance between the camera and the eye in the captured image using depth information of the captured image using, e.g., a stereo camera. The processor 460 may emit light using, e.g. an IR LED, and determine the distance between the camera and the eye in the captured image based on the size of the light reflection area on the captured image. The processor 460 may determine the distance between the camera and the eye in the captured image using, e.g., an autofocus (AF) function of the camera.

According to an embodiment of the present disclosure, the processor 460 may perform different types of control on the IR LED emission depending on the type of the user mode. For example, where the user mode is the kids mode, the processor 460 may set the maximum brightness of the IR LED emission to a value (e.g., 50%) that is lower than that of the normal mode or set the duration of IR LED emission to a shorter time than the normal mode.

According to an embodiment of the present disclosure, the processor 460 may determine whether the distance between the camera and the eye in the captured image is a distance appropriate for iris recognition, e.g., the first distance between the eye and the camera within which iris recognition is possible. The processor 460 may determine whether the distance between the camera and the eye in the captured image is a distance inappropriate for iris recognition, e.g., the second distance between the eye and the camera within which iris recognition is impossible. According to an embodiment of the present disclosure, the first distance may be a particular first distance that is iris recognizable or a first distance that belongs to a predetermined iris-recognizable interval. According to an embodiment of the present disclosure, the processor 460 may perform control to display a first image when the distance between the electronic device and the object included in the captured image is the first distance and a second image when the distance between the electronic device and the object included in the captured image is the second distance different from the first distance. For example, the processor 460 may perform control to display a guide image for guiding the position where the eye is to be displayed on the screen for iris recognition and may then perform control to display the first image or second image.

According to an embodiment of the present disclosure, the processor 460 may read the first image from the memory 440. The processor 460 may perform control to display a first image when the distance between the electronic device and the object included in the captured image is the first distance. When the distance between the electronic device and the object included in the captured image is the second distance different from the first distance, the processor 460 may perform control to change the first image to the second image according to the second distance and display the changed second image. For example, the processor 460 may change the first image to the second image by differently processing at least one or more of the shape, clarity, transparency, brightness, color, or object size of the first image to make a difference between the first distance and the second distance depending on the second distance.

According to an embodiment of the present disclosure, the processor 460 may perform control to display a first image when the distance between the electronic device and the object included in the captured image is the first distance. When the distance between the electronic device and the object included in the captured image is the second distance different from the first distance, the processor 460 may select one among a plurality of second images stored in the memory according to the second distance and display the selected second image. For example, the second image may be an image obtained by varying at least one or more of the shape, clarity, transparency, brightness, color, or object size of the first image to make a difference between the first distance and the second distance according to the second distance.

According to an embodiment of the present disclosure, the processor 460 may determine the shake, illuminance or motion of the electronic device 401 or the direction in which the front surface of the electronic device 401 faces and the direction of the user's face based on sensor values received while displaying the second image. The processor 460 may process the second image to present at least one effect based on the determination and perform control to display the processed image. For example, the processor 460 may process the second image to present a shaking effect corresponding to the determined shake and perform control to display a third image that is processed to present the shaking effect. For example, the processor 460 may process the second image to present an effect corresponding to the determined illuminance, corresponding to the determined illuminance and perform control to display a fourth image that is processed to present the effect corresponding to the illuminance. For example, the processor 460 may process the second image to present an effect corresponding to the determined motion, corresponding to the determined motion and perform control to display a fifth image that is processed to present the effect corresponding to the motion. For example, the processor 460 may process the second image to present an effect corresponding to the direction in which the front surface of the electronic device faces and the direction of the user's face and perform control to display a sixth image that is processed to present the effect corresponding to the two directions.

According to an embodiment of the present disclosure, when the distance between the object included in the image captured by the camera and the electronic device is the first distance (e.g., a particular iris-recognizable distance or a distance in an iris-recognizable range), the processor 460 may perform authentication using the stored first iris image and the object included in the captured image.

Figure 5:
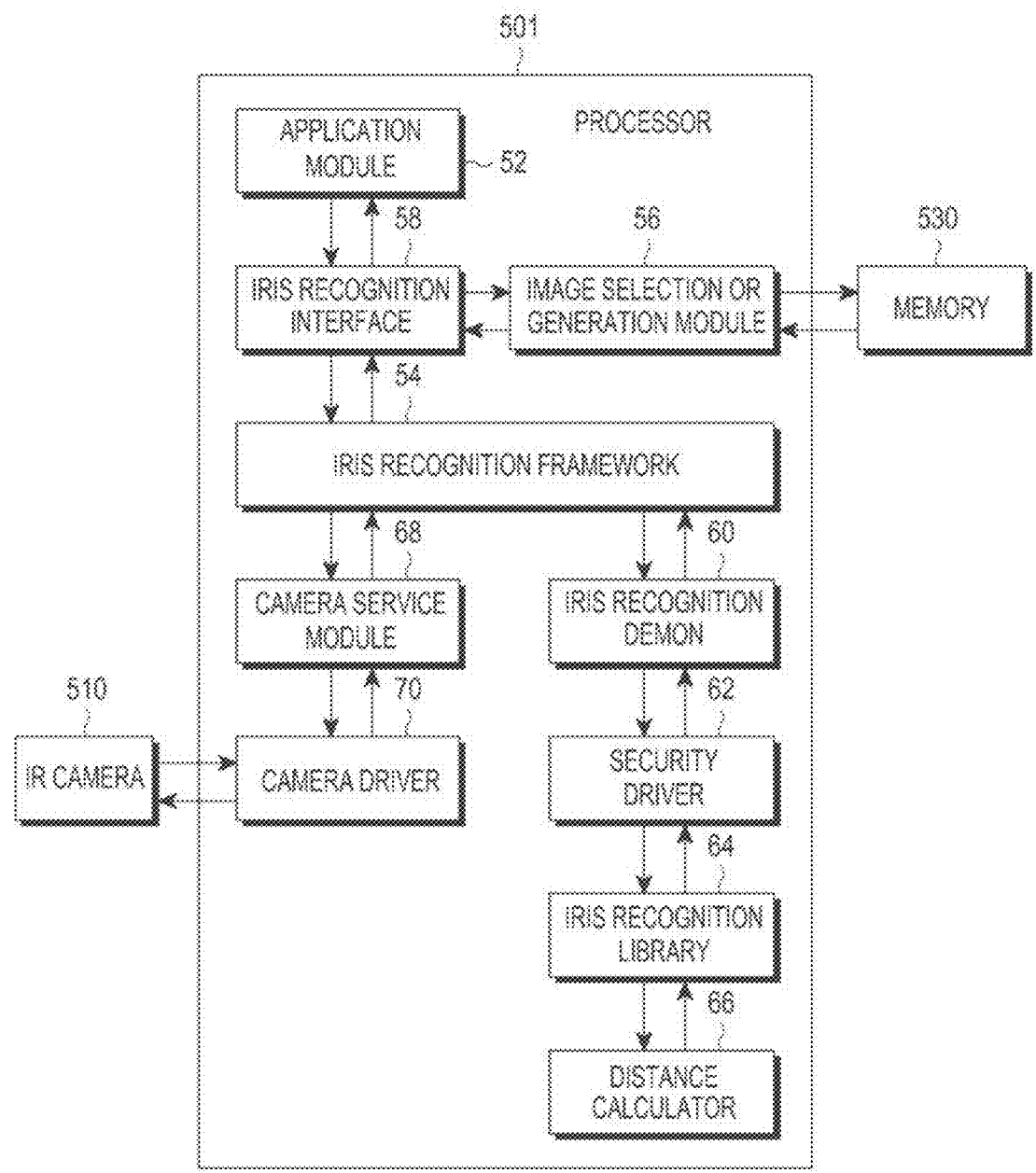
FIG. 5 illustrates a concept view of a processor of an electronic device according to an embodiment of the present disclosure

FIG. 5 is a concept view illustrating a processor of an electronic device according to an embodiment of the present disclosure. Referring to FIG. 5, a processor 501 may include an application module 52, an iris recognition interface 58, an image selection or generation module 56, an iris recognition framework 54, an iris recognition demon 60, a security driver 62, an iris recognition library 64, a distance calculator 66, a camera service module 68, or a camera driver 70.

According to an embodiment of the present disclosure, the application module 52 may be a module that runs various applications executable on the electronic device. The iris recognition interface 58 may function as an interface between the application and the iris recognition framework 54 and the image selection or generation module 56. The iris recognition framework 54 may include an overall framework necessary to perform iris recognition. The iris recognition demon 60 may be a program that continues to run to process iris recognition requests. The iris recognition demon 60 may deliver a received iris recognition request to the iris recognition framework 54. The security driver 62 may be driven when security is required and send a request for iris recognition. The iris recognition library 64 may provide libraries necessary for iris recognition when receiving the iris recognition request. The distance calculator 66 may measure the distance between the electronic device (or IR camera 510) and an object in an image captured by the IR camera 510 using the iris recognition libraries and calculate a proper distance for iris recognition, e.g., a first distance between the IR camera 510 and an iris-recognizable object, based on the measured distance. According to an embodiment of the present disclosure, the first distance may be a particular distance value that is iris-recognizable or a predetermined distance interval that is iris-recognizable. According to an embodiment of the present disclosure, the first distance may be a value as set.

The camera service module 68 may instruct the camera driver 70 to drive when camera capture is required. The camera driver 70 may drive the IR camera 510. When the distance between an object in an image captured by the camera and the IR camera 510 is a second distance which is different from the first distance, the image selection or generation module 56 may select or generate a second image associated with a first image corresponding to the first distance.

According to an embodiment of the present disclosure, the image selection or generation module 56 may read the first image from the memory 540. The image selection or generation module 56 may select the first image when the distance between the electronic device and the object included in the captured image is the first distance. When the distance between the electronic device and the object included in the captured image is the second distance different from the first distance, the image selection or generation module 56 may change the first image to the second image according to the second distance. The image selection or generation module 56 may change the first image to the second image by differently processing at least one or more of the shape, clarity, transparency, brightness, color, or object size of the first image to make a difference between the first distance and the second distance depending on the second distance. When the distance between the electronic device and the object included in the captured image is, e.g., the second distance different from the first distance, the image selection or generation module 56 may select the second image which has been changed according to the second distance from among a plurality of second images stored in the memory. For example, the second image may be an image obtained by varying at least one or more of the shape, clarity, transparency, brightness, color, or object size of the first image to make a difference between the first distance and the second distance according to the second distance.

According to an embodiment of the present disclosure, the electronic device may display a first image on a display when a distance between an electronic device and an object included in an image captured by a camera is a first distance in the electronic device and display a second image associated with the first image on the display when the distance between the electronic device and the object included in the image captured by the camera is a second distance different from the first distance.

According to an embodiment of the present disclosure, the electronic device may further perform authentication using a first iris image and the object included in the captured image when the distance between the electronic device and the object included in the image captured by the camera is a distance within an iris-recognizable range.

According to an embodiment of the present disclosure, the electronic device may further display a first image selected corresponding to the first distance among the plurality of images when the distance between the object and the electronic device is the first distance and a second image selected corresponding to the second distance among the plurality of images when the distance between the object and the electronic device is the second distance.

According to an embodiment of the present disclosure, the second image may be varied according to the second distance.

According to an embodiment of the present disclosure, the second image may be obtained by varying at least one or more of a shape, clarity, transparency, brightness, color, or object size of the first image to make a difference between the first distance and the second distance.

According to an embodiment of the present disclosure, the electronic device may further sense a shake of the electronic device, perform a process to provide an effect corresponding to the sensed shake to the second image corresponding to the sensed shake, and display a third image processed to present the effect corresponding to the sensed shake.

According to an embodiment of the present disclosure, the electronic device may further sense an illuminance, perform a process to provide an effect corresponding to the sensed illuminance to the second image corresponding to the sensed illuminance, and display a fourth image processed to present the effect corresponding to the sensed illuminance.

According to an embodiment of the present disclosure, the electronic device may further sense a motion of the electronic device, perform a process to provide an effect corresponding to the sensed motion to the second image corresponding to the sensed motion, and display a fourth image processed to present the effect corresponding to the sensed motion.

According to an embodiment of the present disclosure, the electronic device may further display a guide image for guiding where an eye is to be positioned on the display.

According to an embodiment of the present disclosure, the electronic device may further determine an age of an object obtained by the camera and perform control to display the first image and the second image based on a result of the determination.

According to an embodiment of the present disclosure, the electronic device may further reduce a strength or time of infrared (IR) light emission of the camera when the age of the object corresponds to a kids mode.

Figure 6:
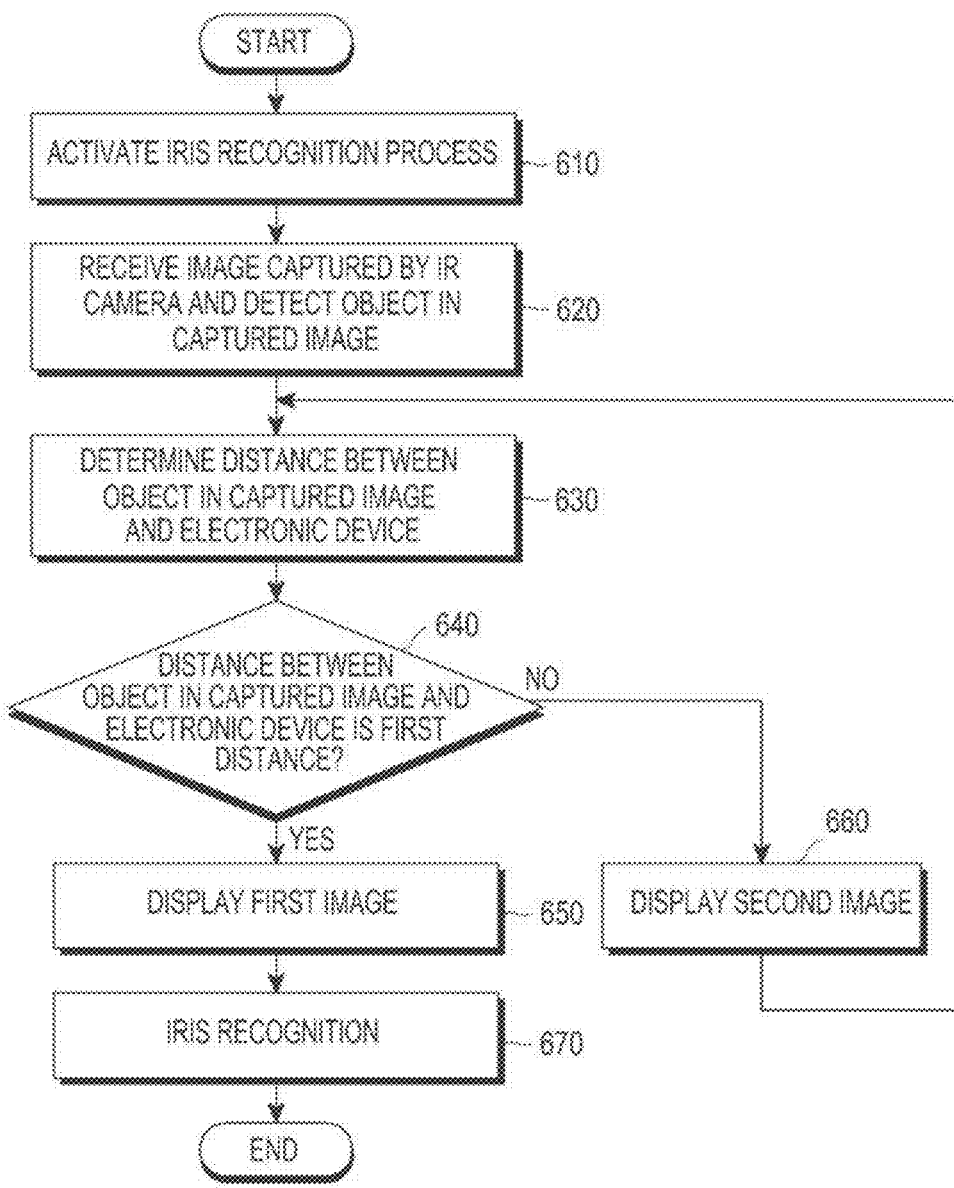
FIG. 6 illustrates a flowchart of an image display operation for iris recognition in an electronic device according to an embodiment of the present disclosure.

FIG. 6 is a flowchart illustrating an image display operation for iris recognition in an electronic device according to an embodiment of the present disclosure.

Referring to FIG. 6, the electronic device 401 may activate an iris recognition processor according to a user's request or a predetermined iris recognition process activation condition in operation 610. For example, the electronic device 401 may determine, e.g., a user mode, and determine whether the iris recognition process is active depending on the type of user mode. Upon determining that the iris recognition process is inactive, the electronic device 401 may instead activate other authentication function (e.g., fingerprint, face, or password recognition). For example, where the widget user experience (UX) or user interface (UI) for infants or kids is chosen as a kids mode or a function or application requesting authentication is determined to be one for infants/kids through settings, the electronic device 401 may activate an authentication process that is safer or easier to use than the iris recognition process instead of the iris recognition process. The electronic device 401 may determine the user's age group using user age group information stored in association with a program (e.g., a function or application) installed on the electronic device 401 and determine whether the user mode is the kids mode or a normal mode using the determined user age group. The electronic device 401 may determine the user age group using, e.g., the age rating of the content (e.g., video or audio) that is running and may determine whether the user mode is the kids mode or normal mode using the determined user age group. The electronic device 401 may measure the age through various sensors before performing the iris recognition process, determine the user's aging group using the measured value, and determine whether the user mode is the kids mode or normal mode using the determined user age group.

According to an embodiment of the present disclosure, the electronic device 401 may analyze a voice signal received through the microphone, determining whether the user's age group falls within infants or kids. The electronic device 401 may analyze a voice signal received through the microphone, determining the user's gender. The electronic device 401 may drive a normal camera to capture an image including the user's face and analyze the captured face image, determining the user's age group.

When the iris recognition process is activated, the electronic device 401 may receive an image captured by the IR camera 410 and detect an object (e.g., the user's eye or iris) in the captured image in operation 620.

The electronic device 401 may determine the distance between the object in the captured image and the electronic device (or the IR camera 410) in operation 630. For example, the electronic device 401 may determine the distance between the camera and the eye in the captured image using the eye-to-eye distance (e.g., the distance between the left and right eyes) and the size of the facial portion in the captured image. The processor 460 may detect a phase difference as per the time difference of a light reflection using, e.g., a time-of-flight (TOF) sensor, and determine the distance between the camera and the eye in the captured image using the detected phase difference of light. The processor 460 may determine the distance between the camera and the eye in the captured image using depth information of the captured image using, e.g., a stereo camera. The processor 460 may emit light using, e.g. an IR LED, and determine the distance between the camera and the eye in the captured image based on the size of the light reflection area on the captured image. The processor 460 may determine the distance between the camera and the eye in the captured image using, e.g., an autofocus (AF) function of the camera.

The electronic device 401 may determine whether the distance between the camera and the object in the captured image is the first distance in operation 640. For example, the first distance may be a distance appropriate for iris recognition, e.g., the distance between the camera and the eye within which iris recognition is possible. According to an embodiment of the present disclosure, the first distance may be a particular distance value that is iris-recognizable or a predetermined distance interval that is iris-recognizable. According to an embodiment of the present disclosure, the first distance may be a value that is set or calculated.

When the distance between the camera and the object in the captured image is the first distance, the electronic device 401 may display the first image in operation 650.

The electronic device 401 may perform iris recognition in operation 670.

When the distance between the camera and the object in the captured image is the second distance which is different from the first distance, the electronic device 401 may display the second image according to the second distance different from the first distance in operation 660. For example, the electronic device 401 may make changes to at least one or more of the shape, clarity, transparency, brightness, color, or object size of the first image to make a difference between the first distance and the second distance depending on the second distance and may display the changed second image. For example, the electronic device 401 may select the second image in which at least one or more of the shape, clarity, transparency, brightness, color, or object size of the first image has been changed to make a difference between the first distance and the second distance depending on the second distance, from among the plurality of second images stored in the memory 440 and may display the selected second image. After displaying the second image, the electronic device 401 may go back operation 630, repeating operations 630 to 670 depending on the distance between the camera and the object in the captured image.

Figure 7A:
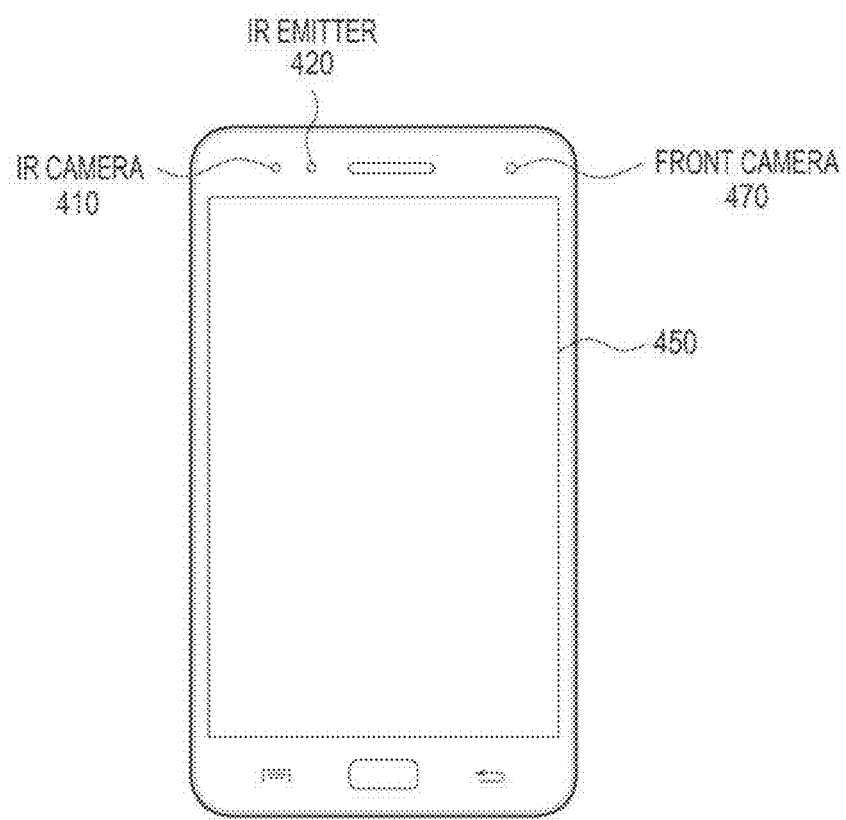
FIGS. 7A and 7B illustrate front perspective views of an electronic device according to an embodiment of the present disclosure.
Figure 7B:
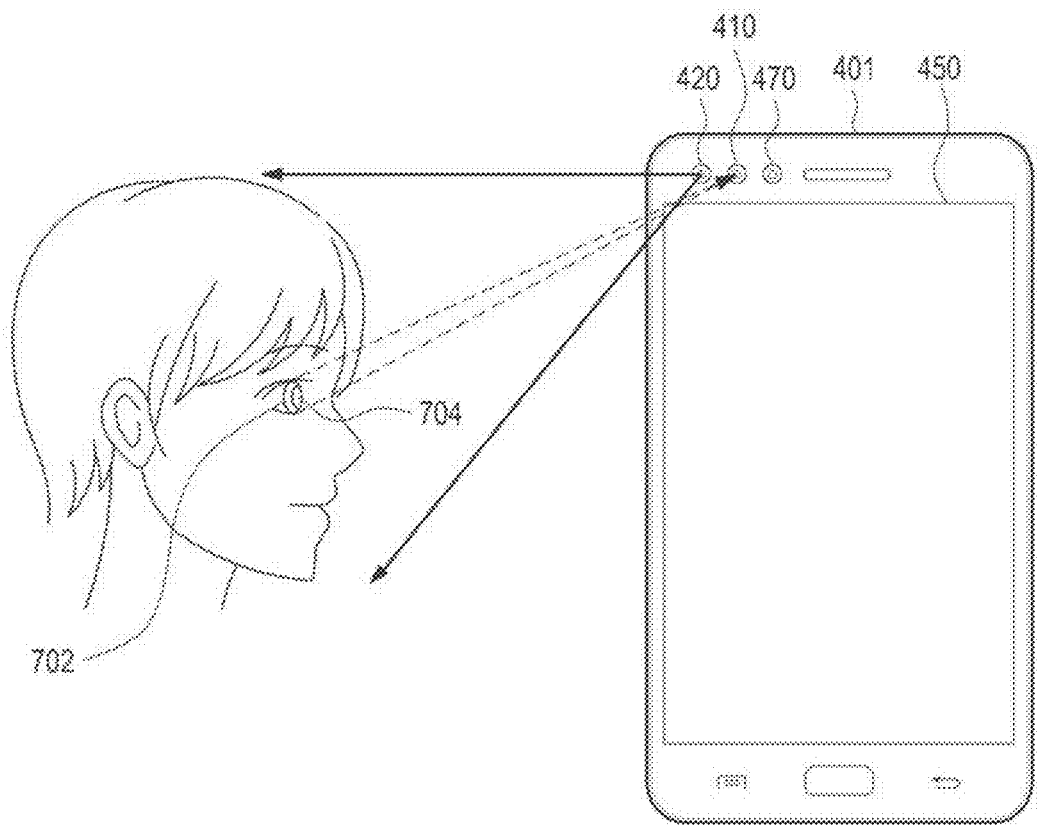

FIGS. 7A and 7B are front perspective views illustrating an electronic device according to an embodiment of the present disclosure.

Referring to FIG. 7A, an electronic device 401 may include a display 450, an IR camera 410, an IR emitter 420, or a front camera 470. The IR camera 410 may include, e.g., the IR emitter 420. The IR camera 410, unless using IR rays, may not include the IR emitter 420. The electronic device 401 may perform image capture for iris recognition using the front camera 470.

Referring to FIG. 7B, the IR camera 410, the IR emitter 420, and the front camera 430 may be arranged adjacent to each other in an upper portion of the front surface. The IR emitter 420 may emit an IR ray to the user's eye 702. The IR camera 410 may capture the eye 702 into an image for the iris 704.

According to an embodiment of the present disclosure, the IR camera 410 and the IR emitter 420 may be arranged in any position of the electronic device 401 where they can capture the user's eye 702 into an image for the iris 704, and various changes or modifications may be made to the arrangement or the position of arrangement of the IR camera 410 and the IR emitter 420. The electronic device 401 may capture an object (the user's eye or iris) using the front camera 470 and determine the distance between the electronic device and the object using the captured image.

Figures 8A, 8B:
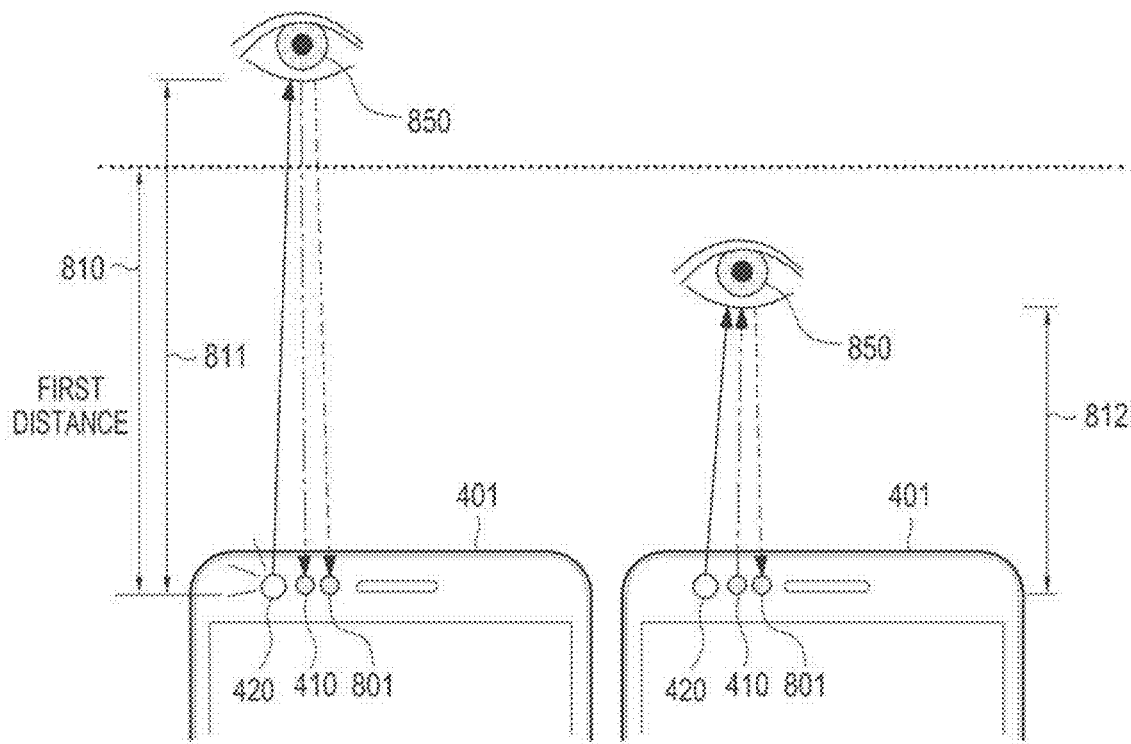
FIGS. 8A and 8B illustrate a view of a distance between an object and an IR camera according to an embodiment of the present disclosure.

FIGS. 8A and 8B is a view illustrating a distance between an object and an IR camera according to an embodiment of the present disclosure.

Referring to FIGS. 8A and 8B, the electronic device 401 may determine distances 811 and 812 between the IR camera 410 and a target (e.g., the user's eye or iris, hereinafter it is assumed to be the user's eye) 850 using a distance sensor 801.

According to an embodiment of the present disclosure, the distance sensor 801 may perform metering or detection to measure the distances 811 and 812 between the IR camera 410 and the user's eye 850. For example, the distance sensor 801 may perform metering or detection to measure the distances 811 and 812 between the eye 850 and the IR camera 410 by radiating light to the target using an IR LED and sensing the amount of light reflected from the eye 850. The distance sensor 801 may perform metering or detection to measure the distances 811 and 812 between the IR camera 410 and the eye 850, e.g., by radiating an ultrasonic wave or laser beam to the eye 850 using an ultrasound sensor or laser sensor and sensing the ultrasonic wave or laser beam reflecting back from the eye 850. The distance sensor 801 may perform metering or detection to measure the distances 811 and 812 between the IR camera 410 and the eye 850, e.g., by radiating light to the eye 850 and detecting the phase difference as per the time difference of the light reflection from the eye 850. The electronic device 401 may determine the first distance 810, which is iris-recognizable, between the IR camera 410 and the eye 850 based on the distances 811 and 812.

FIG. 8A illustrates an example in which the distance 811 between the eye 850 and the IR camera 410 is larger than the iris-recognizable first distance 810 between the eye 850 and the IR camera 410. FIG. 8B illustrates an example in which the distance 811 between the eye 850 and the IR camera 410 is smaller than the iris-recognizable first distance 810 between the eye 850 and the IR camera 410. Although FIG. 8A illustrates an example in which the first distance 801 is a particular iris-recognizable distance, the first distance 801 may be a predetermined distance interval that is iris-recognizable. According to an embodiment of the present disclosure, the first distance may be a value as set.

According to an embodiment of the present disclosure, the electronic device 401 may determine the difference between the distances 811 and 812 between the IR camera 410 and the eye 850 and the iris-recognizable first distance 810 between the eye 850 and the IR camera 410. When the distances 811 and 812 between the IR camera 410 and the eye 850 is the second distance that differs from the iris-recognizable first distance 810 between the eye 850 and the IR camera 410, the electronic device 401 may display the second image according to the second distance. For example, the second image may be an image obtained by varying at least one or more of the shape, clarity, transparency, brightness, color, or object size of the first image to make a difference between the first distance and the second distance according to the second distance.

FIGS. 9 to 14 are views illustrating examples of display of a second image according to an embodiment of the present disclosure.

Figure 9:
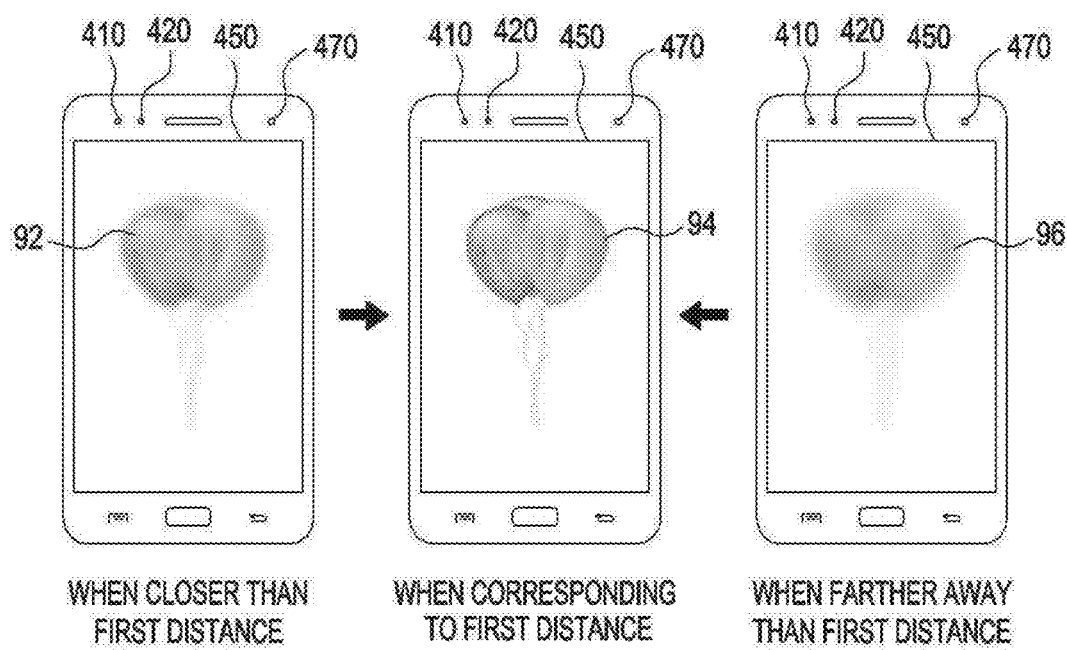
FIGS. 9 to 14 illustrate views of examples of display of a second image according to an embodiment of the present disclosure.

Referring to FIG. 9, the electronic device 401 may display a first image 94 corresponding to the eye 850 on the display 450 when the IR camera 410 is activated. When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 92 obtained by making the first image unclear according to the second distance to make a difference between the first distance and the second distance. For example, where the second distance is larger than the first distance, the electronic device 401 may display, on the display 450, the second image 96 obtained by making the first image unclear according to the second distance to make a difference between the first distance and the second distance. Making the first image unclear may be any one of blurring, noising, pixelization, mosaicking, or giving a glass effect, or any other schemes for adjusting the clarity of the target image to allow the user to be intuitively aware how unclear the target image is. For example, the electronic device 401 may render the second image more unclear as the difference between the first distance and the second distance increases.

Figure 10:
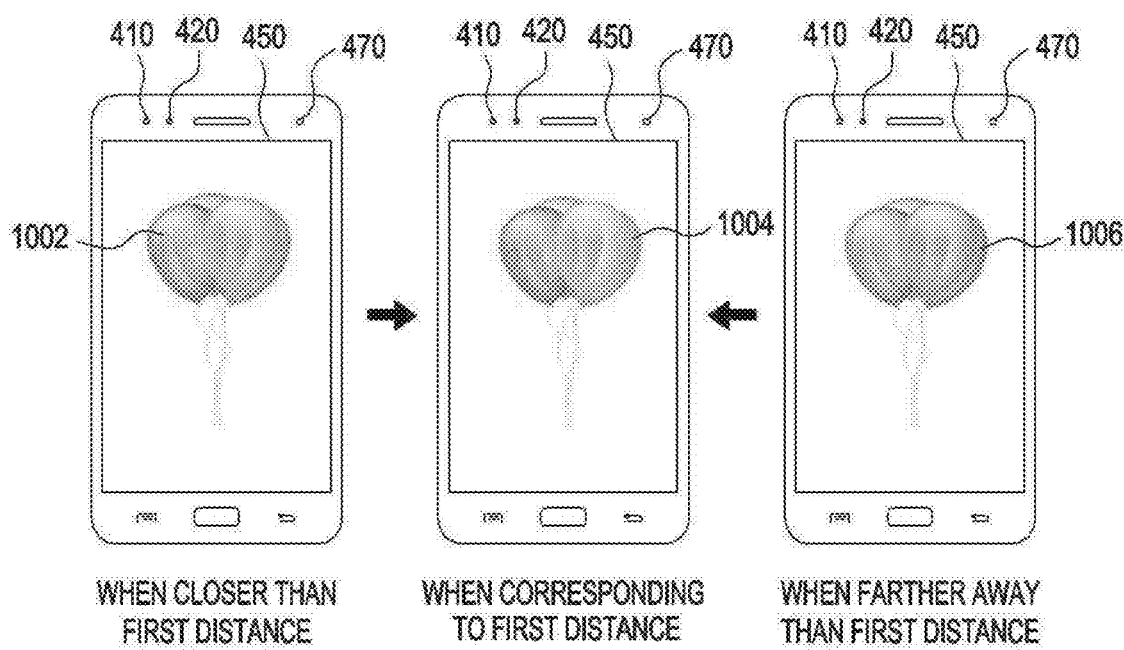

Referring to FIG. 10, the electronic device 401 may display a first image 1004 corresponding to the eye 850 on the display 450 when the IR camera 410 is activated. When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 1002 obtained by changing the transparency of the first image 1004 according to the second distance to make a difference between the first distance and the second distance. When the second distance is larger than the first distance, the electronic device 401 may display, on the display 450, the second image 1006 obtained by changing the transparency of the first image 1004 according to the second distance to make a difference between the first distance and the second distance. For example, the electronic device 401 may render the second image more transparent as the difference between the first distance and the second distance increases.

Figure 11:
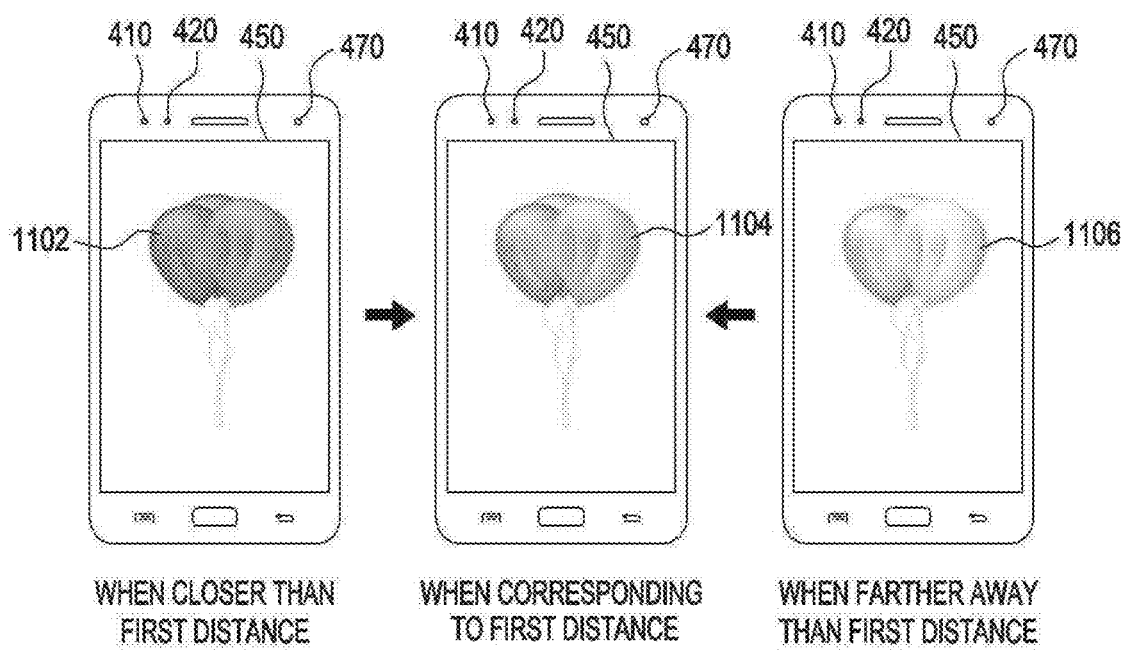

Referring to FIG. 11, the electronic device 401 may display a first image 1104 corresponding to the eye 850 on the display 450 when the IR camera 410 is activated. When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 1102 obtained by darkening the first image 1104 according to the second distance to make a difference between the first distance and the second distance. When the second distance is larger than the first distance, the electronic device 401 may display, on the display 450, the second image 1106 obtained by brightening the first image 1104 according to the second distance to make a difference between the first distance and the second distance. For example, the electronic device 401 may render the second image brighter or darker as the difference between the first distance and the second distance increases.

Figure 12:
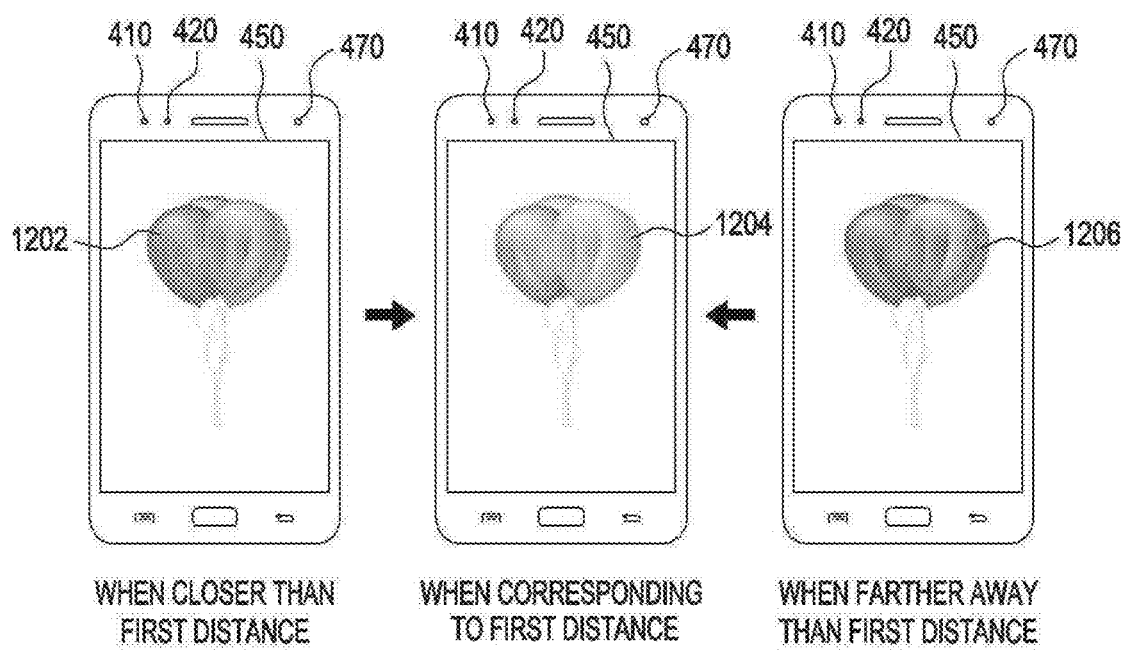

Referring to FIG. 12, the electronic device 401 may display a first image 1204 on the display 450 when the IR camera 410 is activated. When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 1202 obtained by changing the color of the first image 1204 from a first color to a second color according to the second distance to make a difference between the first distance and the second distance. When the second distance is larger than the first distance, the electronic device 401 may display, on the display 450, the second image 1206 obtained by changing the color of the first image 1204 from the first color to a third color according to the second distance to make a difference between the first distance and the second distance. For example, the electronic device 401 may perform a process to increase the difference in color between the first image and the second image as the difference between the first distance and the second distance increases.

Figure 13:
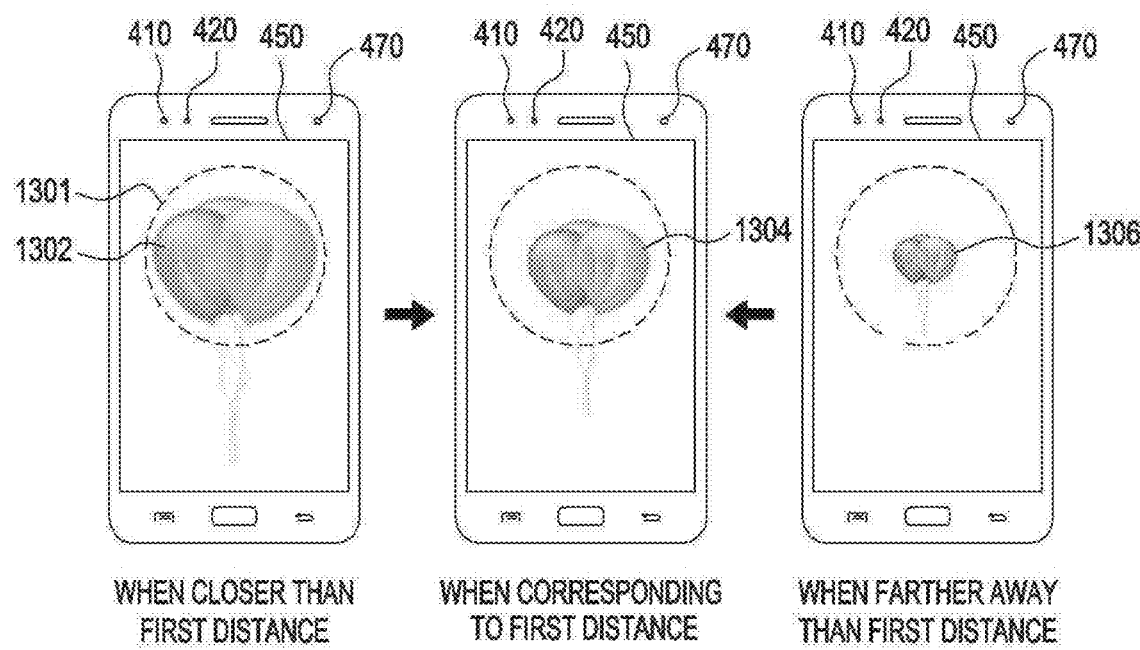

Referring to FIG. 13, the electronic device 401 may display a first image 1304 on the display 450 when the IR camera 410 is activated. When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 1302 obtained by enlarging an object in the first image 1304 according to the second distance to make a difference between the first distance and the second distance. When the second distance is larger than the first distance, the electronic device 401 may display, on the display 450, the second image 1306 obtained by shrinking the object in the first image 1304 according to the second distance to make a difference between the first distance and the second distance. For example, the electronic device 401 may perform a process to increase the difference in the size of the object between the first image and the second image as the difference between the first distance and the second distance increases.

Figure 14:
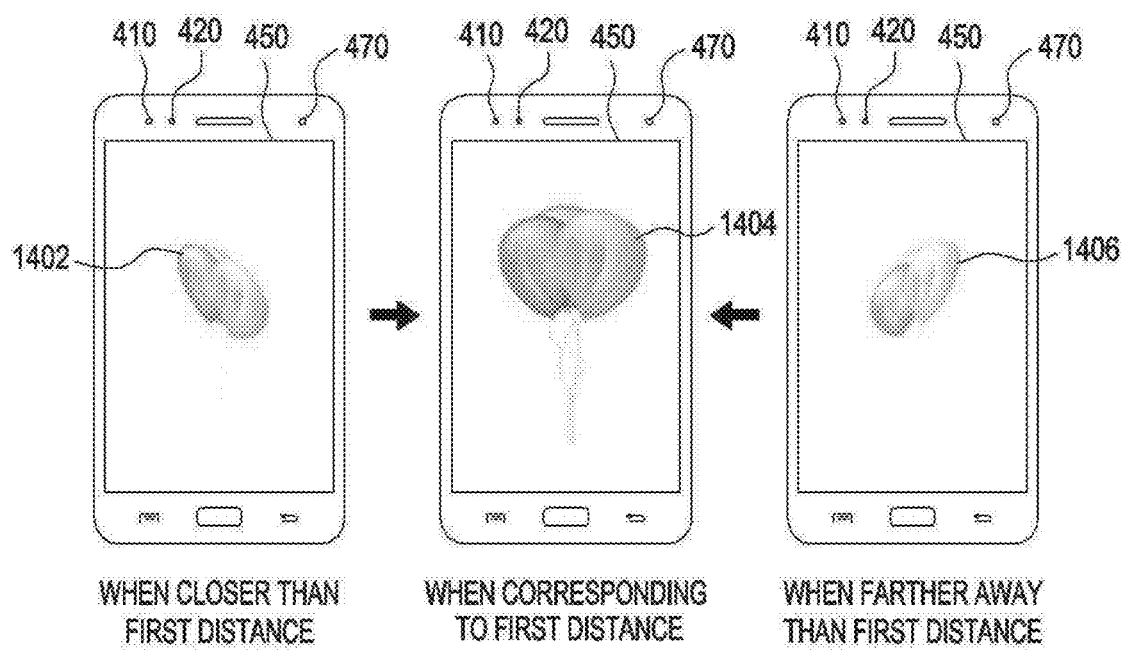

Referring to FIG. 14, the electronic device 401 may display a first image 1404 corresponding to the eye 850 on the display 450 when the IR camera 410 is activated. When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 1402 obtained by transforming an object in the first image 1404 into a first shape according to the second distance to make a difference between the first distance and the second distance. When the second distance is larger than the first distance, the electronic device 401 may display, on the display 450, the second image 1406 obtained by transforming the object in the first image 1404 into a second shape according to the second distance to make a difference between the first distance and the second distance. For example, the electronic device 401 may perform a process to increase the difference in the shape of the object between the first image and the second image as the difference between the first distance and the second distance increases.

Figure 15A:
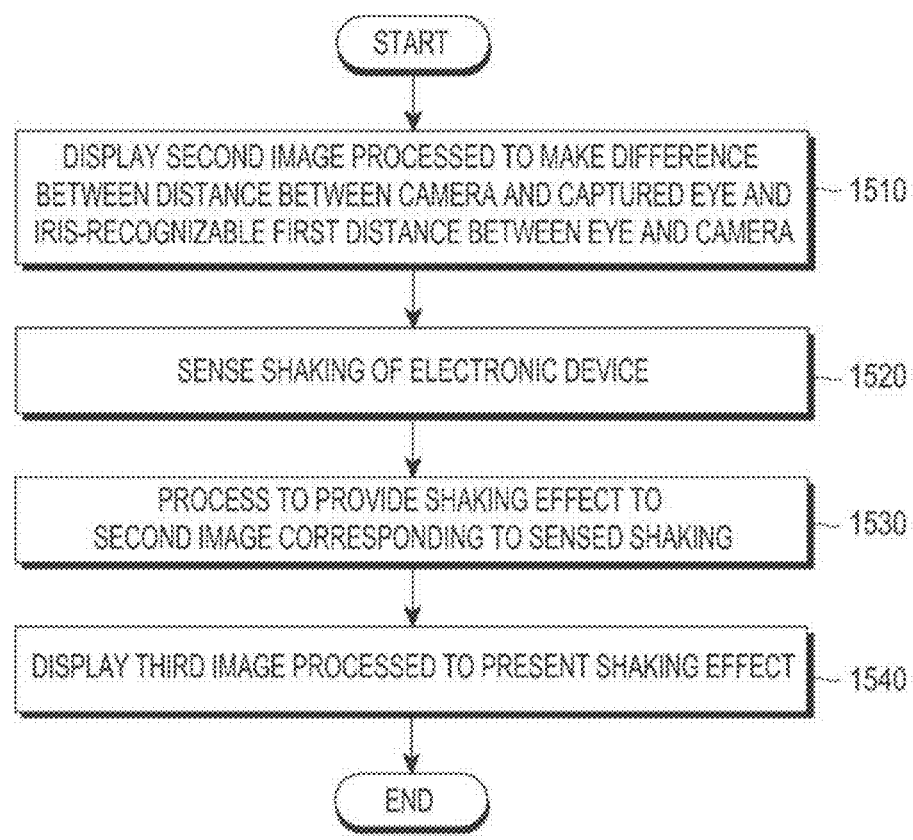
FIGS. 15A and 15B illustrate views of examples of display of a third image when an electronic device shakes with a second image displayed according to an embodiment of the present disclosure.
Figure 15B:
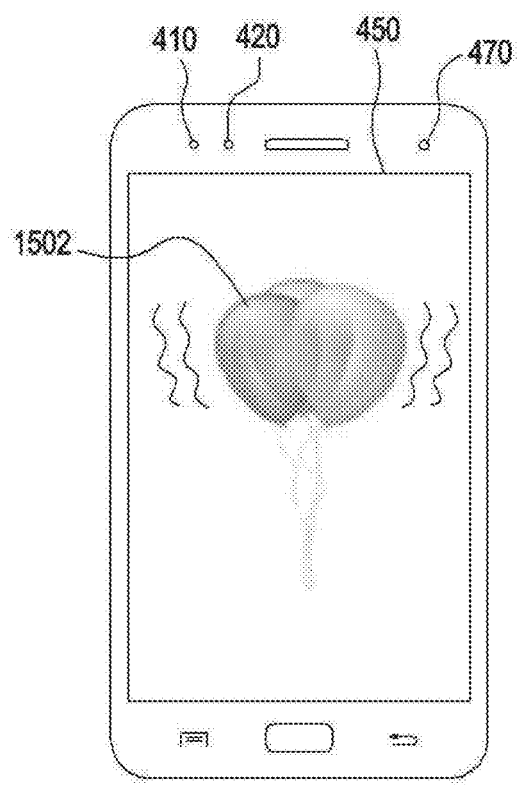

FIGS. 15A and 15B are views illustrating examples of display of a third image when an electronic device shakes according to an embodiment of the present disclosure.

Referring to FIG. 15A, the electronic device 401 may display a second image processed to make a difference between the distance between an eye and a camera and an iris-recognizable first distance between the eye and the camera in operation 1510.

In operation 1520, the electronic device 401 may sense a shake of the electronic device 401 with the second image displayed. For example, the electronic device 401 may sense a shake of the electronic device 401 using a value measured by the acceleration sensor 434. The electronic device 401 may perform a process to present a shaking effect to the second image being displayed corresponding to the sensed shake in operation 1530. The electronic device 401 may display a third image processed to have the shaking effect in operation 1540.

Referring to FIG. 15B, upon detecting a shake while displaying, on the display 450, the second image processed to make a difference between the distance between the camera and the eye and the iris-recognizable first distance between the eye and the camera, the electronic device 401 may display the third image 1502 processed to give a shaking effect to the second image. When the electronic device 401 shakes, the iris recognition rate may be lowered. The user may perform iris recognition after stopping the shake of the electronic device 401 by identifying the third image processed to present the shaking effect on the display 450.

According to an embodiment of the present disclosure, the electronic device 401 may display an image corresponding to the eye regardless of the difference between the distance between the camera and the eye and the iris-recognizable first distance between the eye and the camera, and when the electronic device 401 is shaken, the electronic device 401 may perform a process to present a shaking effect to the image corresponding to the eye and display the image.

Figure 16A:
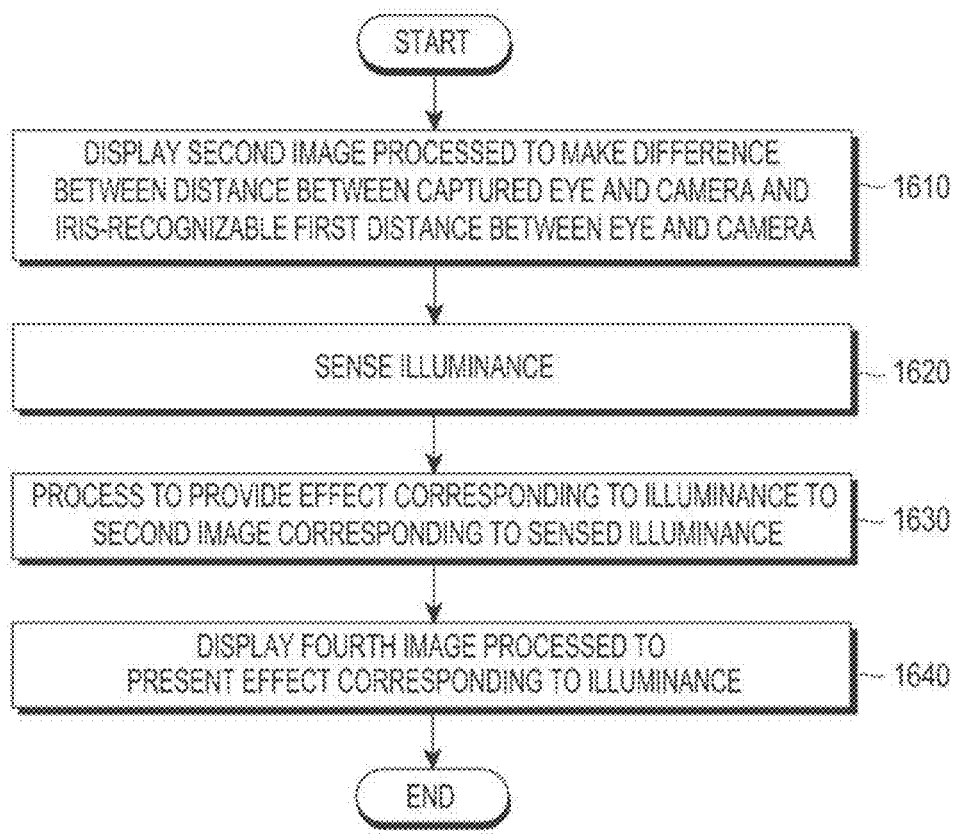
FIGS. 16A and 16B illustrate views of examples of display of a fourth image depending on the illuminance with a second image displayed according to an embodiment of the present disclosure.
Figure 16B:
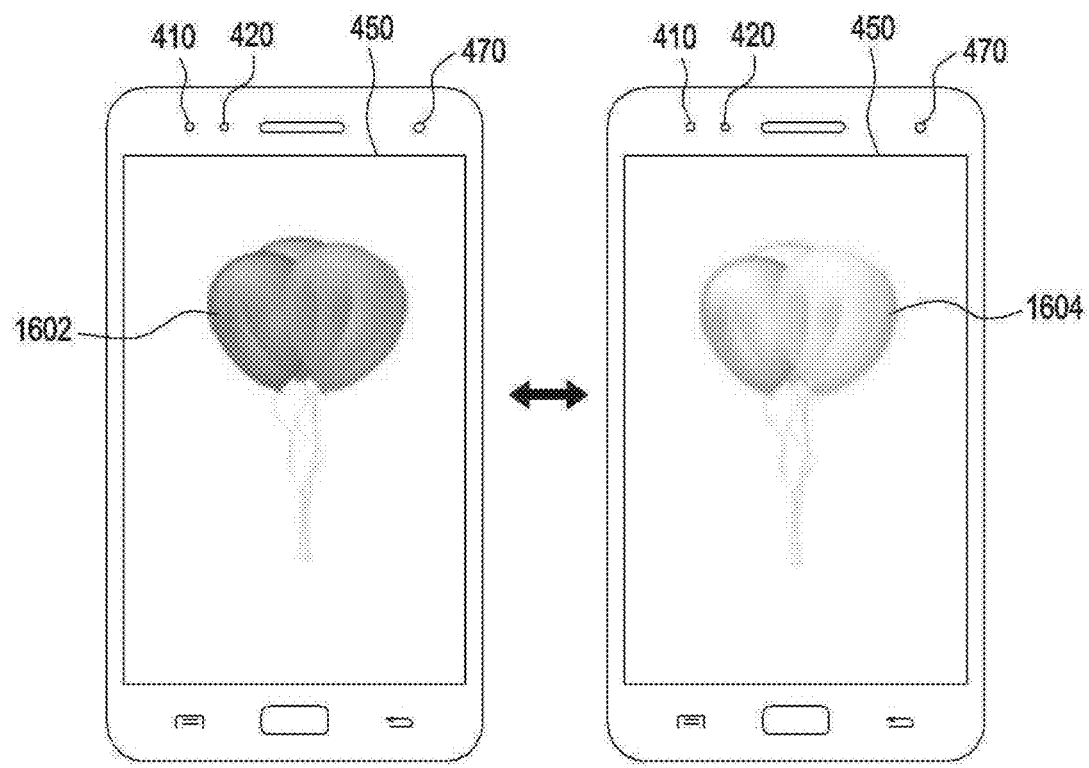

FIGS. 16A and 16B are views illustrating an example of display of a fourth image as per illuminance according to an embodiment of the present disclosure.

Referring to FIG. 16A, the electronic device 401 may display a second image processed to make a difference between the distance between an eye and a camera and an iris-recognizable first distance between the eye and the camera in operation 1610.

In operation 1620, the electronic device 401 may sense the illuminance of the electronic device 401 with the second image displayed. For example, the electronic device 401 may sense the illuminance of the electronic device 401 using a value measured by the acceleration sensor 436. The electronic device 401 may perform a process to provide an effect corresponding to the illuminance to the second image being displayed corresponding to the sensed illuminance in operation 1630. The electronic device 401 may display a fourth image processed to have the effect corresponding to the illuminance in operation 1640.

Referring to FIG. 16B, upon detecting the illuminance while displaying, on the display 450, the second image processed to make a difference between the distance between the camera and the eye and the iris-recognizable first distance between the eye and the camera, when the sensed illuminance is higher than a reference illuminance, the electronic device 401 may perform a process to darken the second image and display a fourth image 1602 processed to darken on the display 450. Or, when the sensed illuminance is lower than the reference illuminance, the electronic device 401 may perform a process to brighten the second image and display the fourth image 1604 processed to brighten on the display 450. When the illuminance of the electronic device 401 is higher or lower than a preset reference, the iris recognition rate may be lowered. The user may adjust the illuminance and then perform iris recognition by identifying the fourth image processed to present an effect corresponding to the illuminance of the display 450.

According to an embodiment of the present disclosure, the electronic device 401 may display an image corresponding to the eye regardless of the difference between the distance between the camera and the eye and the iris-recognizable first distance between the eye and the camera, and when the illuminance is higher or lower than the reference illuminance, the electronic device 401 may perform a process to present an effect corresponding to the illuminance to the image corresponding to the eye and display the image.

Figure 17A:
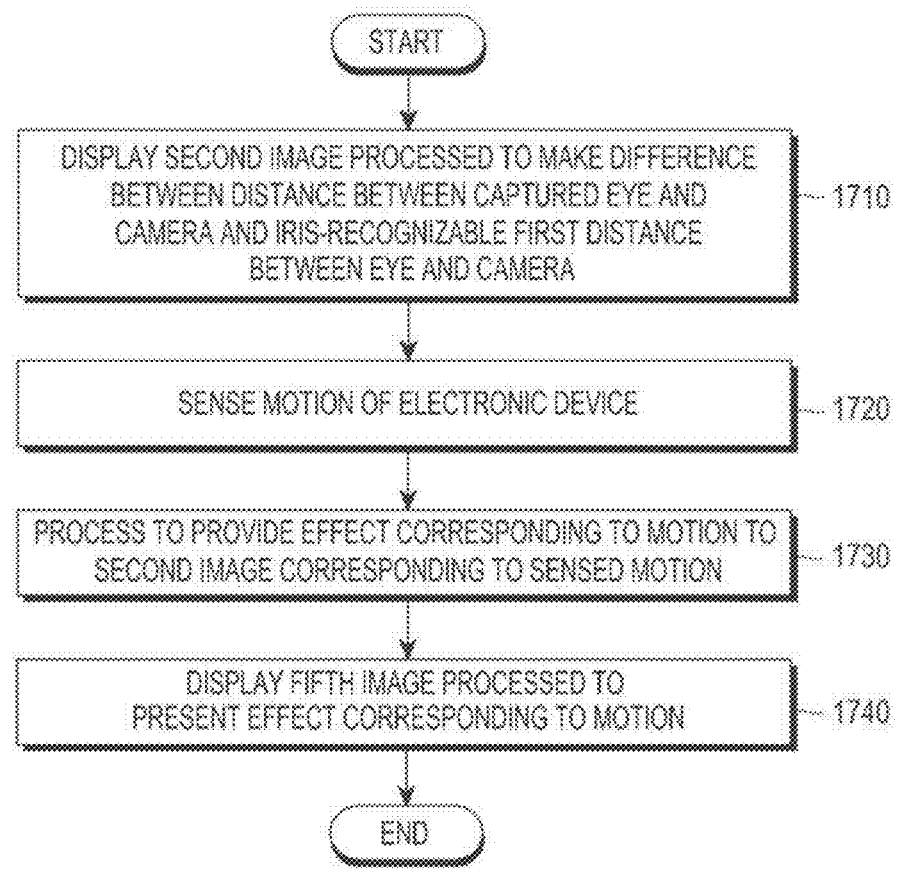
FIGS. 17A and 17B illustrate views of examples of display of a fifth image when an electronic device moves with a second image displayed according to an embodiment of the present disclosure.
Figure 17B:
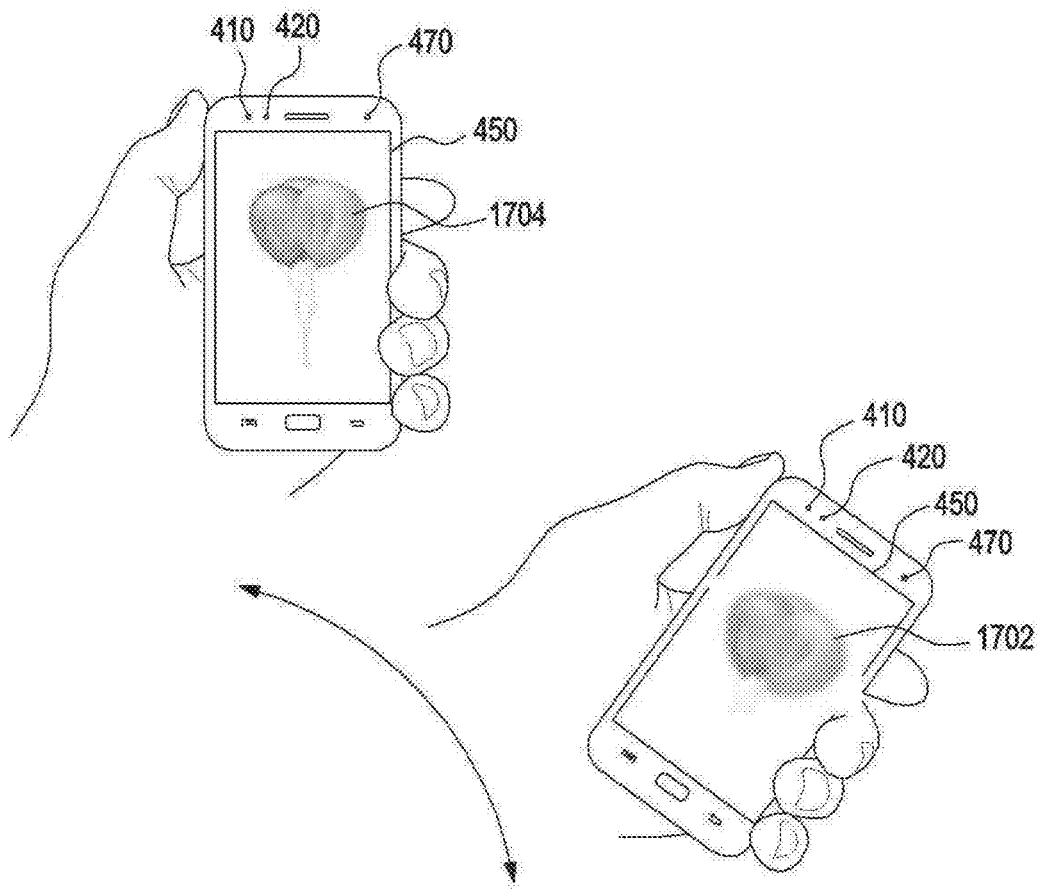

FIGS. 17A and 17B are views illustrating examples of display of a fifth image as an electronic device moves according to an embodiment of the present disclosure.

Referring to FIG. 17A, the electronic device 401 may display a second image processed to make a difference between the distance between an eye and a camera and an iris-recognizable first distance between the eye and the camera in operation 1710.

In operation 1720, the electronic device 401 may sense a motion of the electronic device 401 with the second image displayed. For example, the electronic device 401 may sense the motion of the electronic device 401 using a value measured by the acceleration sensor 434. The electronic device 401 may perform a process to provide an effect corresponding to the motion to the second image being displayed corresponding to the sensed motion in operation 1730. The electronic device 401 may display a fifth image processed to have the effect corresponding to the motion in operation 1740.

Referring to FIG. 17B, when the user moves the electronic device 401 while displaying, on the display 450, the second image processed to make a difference between the second distance between the camera and the eye and the iris-recognizable first distance between the eye and the camera, the electronic device 401 may display the fifth image processed to give an effect corresponding to the motion to the second image. For example, when the user moves down the electronic device 401, the electronic device 401 may display the fifth image 1702 processed so that the second image is blurred, and when the user moves up the electronic device 401, the electronic device 401 may display the fifth image 1704 processed to make the second image more clear.

According to an embodiment of the present disclosure, the electronic device 401 may display an image corresponding to the eye regardless of the difference between the second distance between the camera and the eye and the iris-recognizable first distance between the eye and the camera, and when the electronic device 401 moves, the electronic device 401 may perform a process to present an effect corresponding to the eye to the image corresponding to the eye and display the image.

Figure 18A:
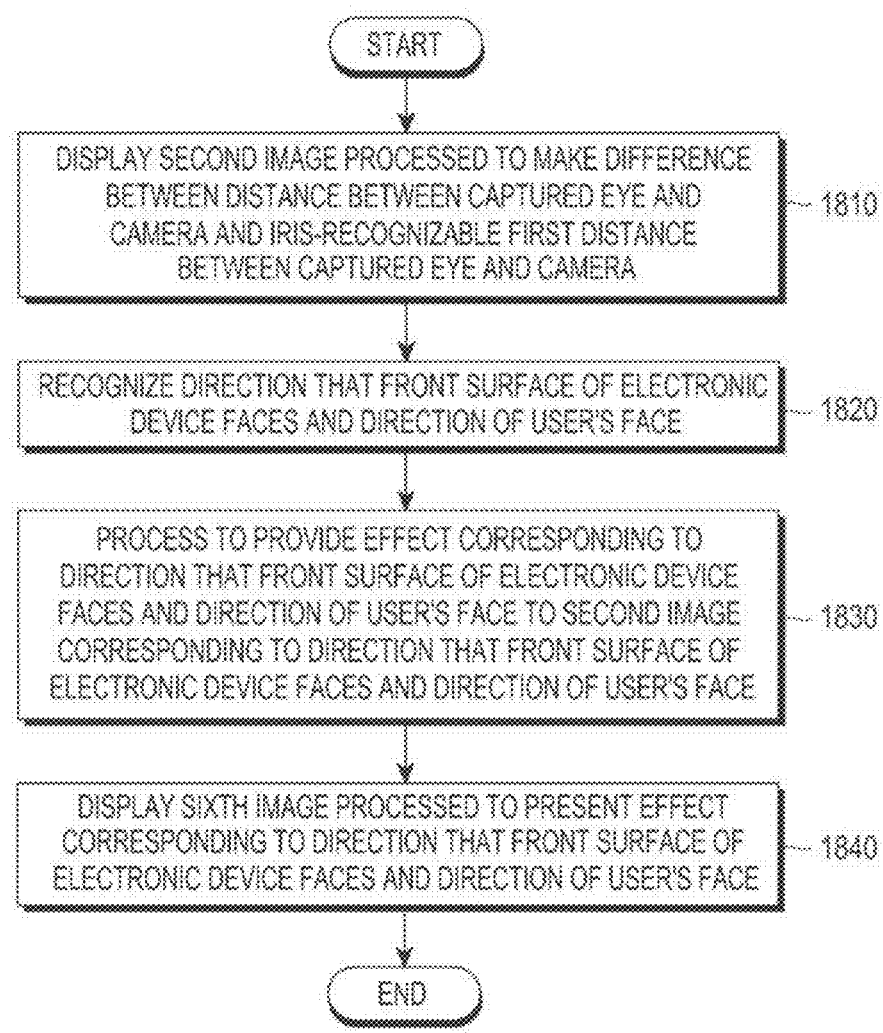
FIGS. 18A and 18B illustrate views of examples of display of a sixth image according to a direction in which a front surface of an electronic device faces and a direction of a user's face with a second image displayed according to an embodiment of the present disclosure.
Figure 18B:
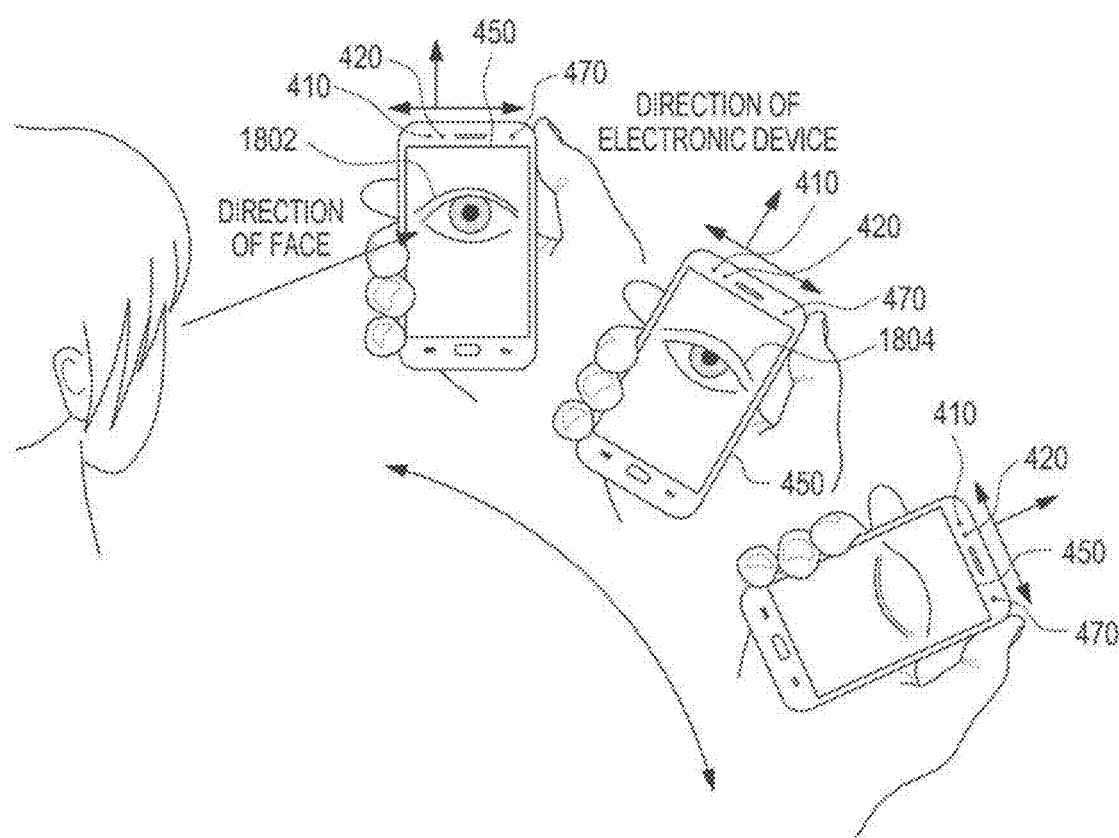

FIGS. 18A and 18B are views illustrating examples of display of a sixth image according to a direction in which a front surface of an electronic device faces and a direction of a user's face displayed according to an embodiment of the present disclosure.

Referring to FIG. 18A, the electronic device 401 may display a second image processed to make a difference between the distance between an eye and a camera and an iris-recognizable first distance between the eye and the camera in operation 1810.

In operation 1820, the electronic device 401 may sense the direction in which the front surface of the electronic device 401 faces and the direction of the user's face with the second image displayed. For example, the electronic device 401 may determine the direction in which the front surface of the electronic device 401 faces using a value measured by the gyro sensor 438. For example, the electronic device 401 may capture the user's face using the front camera and analyze the captured image, determining the direction of the user's face. In operation 1830, the electronic device 401 may perform a process to provide an effect corresponding to the direction in which the front surface of the electronic device 401 and the direction of the user's face to the second image corresponding to the direction in which the front surface of the electronic device 401 and the direction of the user's face. In operation 1840, the electronic device 401 may display, on the display 450, a sixth image processed to present an effect corresponding to the direction in which the front surface of the electronic device 401 and the direction of the user's face.

Referring to FIG. 18B, when the electronic device 401 and the user's face face each other while displaying, on the display 450, the second image processed to make a difference between the distance between the camera and the eye and the iris-recognizable first distance between the eye and the camera, the electronic device 401 may display a sixth image 1802 changed so that the eye in the second image is in an open-eye shape. When the electronic device 401 does not face the user's face, the electronic device 401 may display sixth images 1804 and 1806 changed so that the eye in the second image is in a closed-eye shape.

According to an embodiment of the present disclosure, the electronic device 401 may display an image corresponding to the eye regardless of the difference between the distance between the camera and the eye and the iris-recognizable first distance between the eye and the camera, and the electronic device 401 may perform a process to present an effect corresponding to the direction in which the front surface of the electronic device 401 and the direction of the user's face to the image corresponding to the eye according to the direction in which the front surface of the electronic device 401 and the direction of the user's face and display the image.

Figure 19:
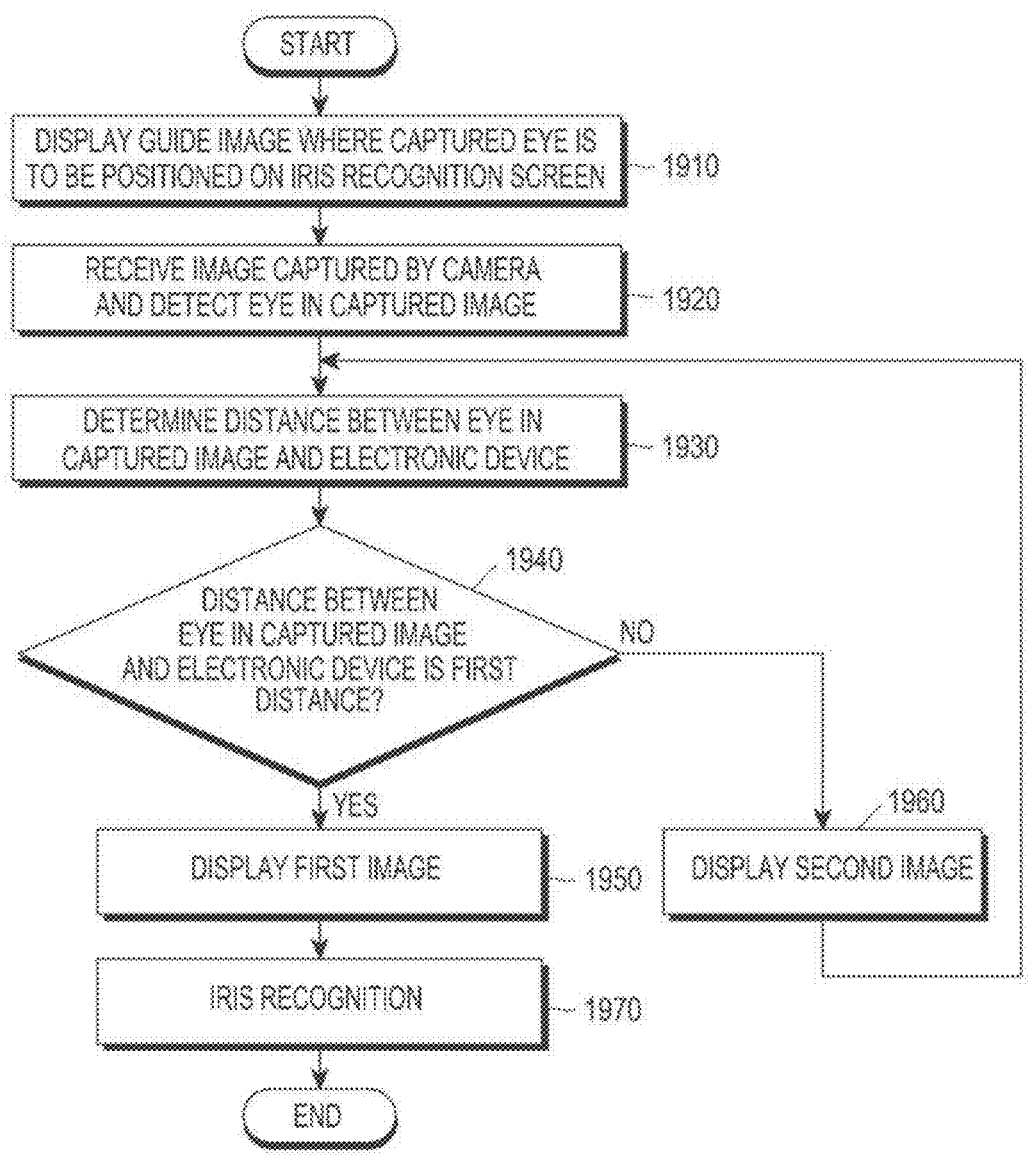
FIG. 19 illustrates a view of operations when a guide image where an eye is to be positioned is displayed on an iris recognition screen according to an embodiment of the present disclosure.

FIG. 19 is a view illustrating operations when a guide image where an eye is to be positioned is displayed on an iris recognition screen according to an embodiment of the present disclosure.

Referring to FIG. 19, the electronic device 401, when the iris recognition process is activated, may display a guide image where a captured image is to be positioned on the iris recognition screen in operation 1910. According to an embodiment of the present disclosure, the guide image may be an image for guiding where the two pupils are to be positioned.

In operation 1920, the electronic device 401 may receive an image captured by the camera 410 and detect eyes (e.g., the user's eyes or pupils) in the captured image.

In operation 1930, the electronic device 401 may determine the distance between the camera 410 and the eyes in the captured image. For example, the electronic device 401 may determine the distance between the camera and the eyes in the captured image using the eye-to-eye distance and the size of the facial portion in the captured image. The processor 460 may detect a phase difference of a light reflection using, e.g., a time-of-flight (TOF) sensor, and determine the distance between the camera and the eye in the captured image using the detected phase difference of light. The processor 460 may determine the distance between the camera and the eye in the captured image using depth information of the captured image using, e.g., a stereo camera. The processor 460 may emit light using, e.g. an IR LED, and determine the distance between the camera and the eye in the captured image based on the size of the light reflection area on the captured image.

The electronic device 401 may determine whether the distance between the camera and the eyes in the captured image is the first distance in operation 1940. For example, the first distance may be a distance appropriate for iris recognition, e.g., the distance between the camera and the eye within which iris recognition is possible.

When the distance between the camera and the object in the captured image is the first distance, the electronic device 401 may display the first image in operation 1950 and perform iris recognition in operation 1970.

When the distance between the camera and the eyes in the captured image is the second distance which is different from the first distance, the electronic device 401 may display the second image according to the second distance different from the first distance in operation 1960. According to an embodiment of the present disclosure, the electronic device 401 may make changes to at least one or more of the shape, sharpness, transparency, brightness, color, or object size of the first image to make a difference between the first distance and the second distance depending on the second distance and may display the changed second image. According to an embodiment of the present disclosure, the electronic device 401 may select the second image in which at least one or more of the shape, sharpness, transparency, brightness, color, or object size of the first image has been changed to make a difference between the first distance and the second distance depending on the second distance, from among the plurality of second images stored in the memory 440 and may display the selected second image. After displaying the second image, the electronic device 401 may go back operation 1930, repeating operations 1930 to 1960 depending on the distance between the camera and the eyes in the captured image.

Figure 20A:
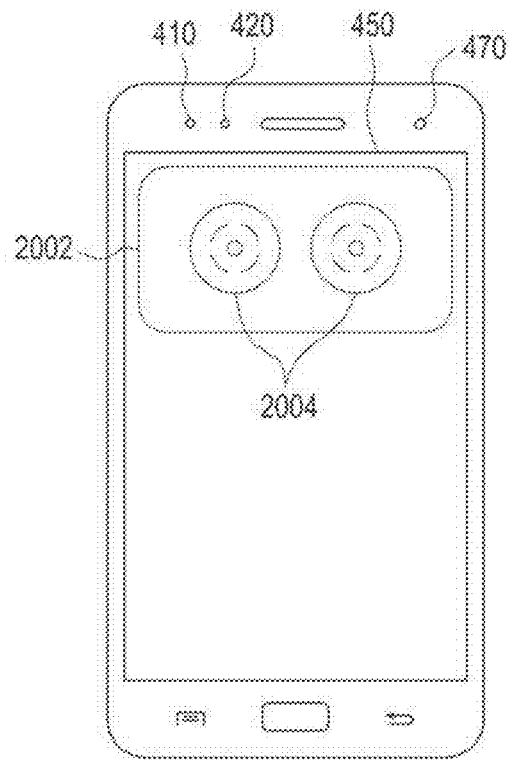
FIGS. 20A and 20B illustrate views of examples of display of a guide image where an eye is to be positioned according to an embodiment of the present disclosure.
Figure 20B:
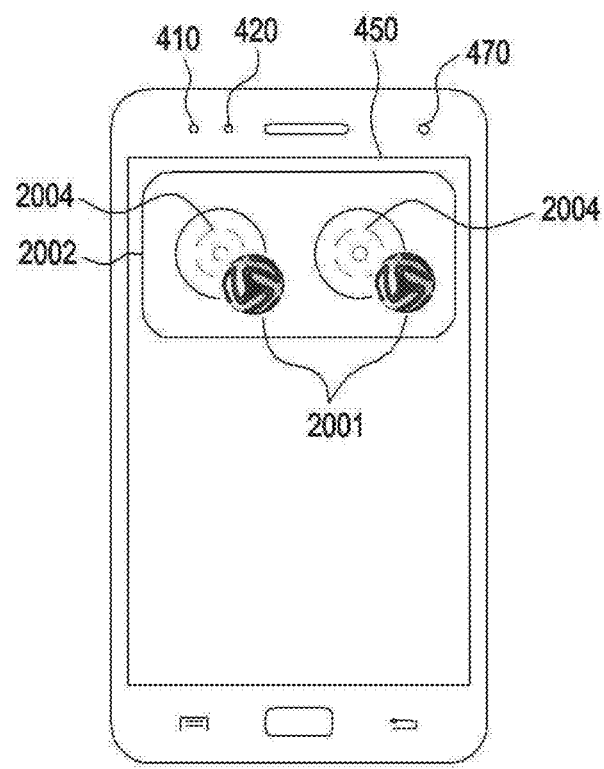

FIGS. 20A and 20B are views illustrating examples of display of a guide image where an eye is to be positioned according to an embodiment of the present disclosure.

Referring to FIG. 20A, the electronic device 401 may display a guide image 2002 where a captured eye is to be positioned on the display 450. According to an embodiment of the present disclosure, the guide image 2002 may be an image for guiding where the two pupils are to be positioned.

Referring to FIG. 20B, the electronic device 401 may display the guide image for guiding where the two pupils are to be positioned, along with an image 2001 corresponding to the captured eye. When a second image 2001 corresponding to the captured eye is not included in the guide image 2002, the user may move the electronic device 401 or his face so that the image 2001 corresponding to the eye captured by the camera is placed in a designated position 2004 of the guide image 2002.

FIGS. 21 to 26 are views illustrating examples of display of a second image on a guide image where an eye is to be positioned according to an embodiment of the present disclosure.

Figure 21:
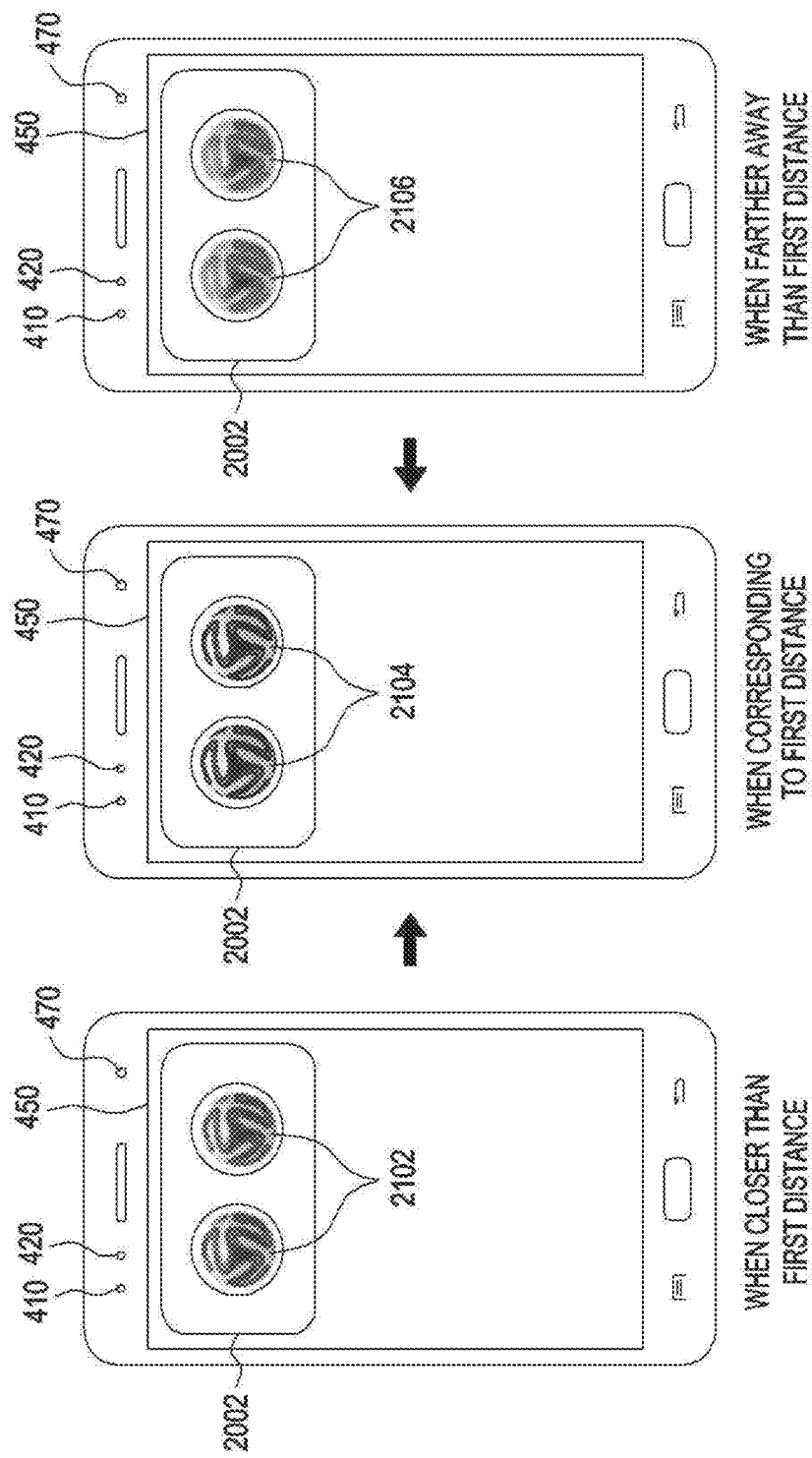
FIGS. 21 to 26 illustrate views of examples of display of a second image on a guide image where an eye is to be positioned according to an embodiment of the present disclosure.

Referring to FIG. 21, the electronic device 401, when the iris recognition process is activated, may display a guide image 2002 where a captured eye is to be positioned on the display 450 and may display a first image 2104 corresponding to the eye 850 on the display 450. The user may move the electronic device 401 or his face so that the first image 2104 is placed in the position where the eye is to be positioned in the guide image 2002. When the second distance (e.g., the distance between the IR camera 410 and the eye 850) is smaller than the first distance (e.g., the iris-recognizable distance between the eye 850 and the camera 410), the electronic device 401 may display, on the display 450, a second image 2102 obtained by reducing the clarity of the first image according to the second distance to make a difference between the first distance and the second distance. Where the second distance is larger than the first distance, the electronic device 401 may display, on the display 450, the second image 2106 obtained by reducing the clarity of the first image according to the second distance to make a difference between the first distance and the second distance. Reducing the clarity of the first image or making the first image unclear may be any one of blurring, noising, pixelization, mosaicking, or giving a glass effect, or any other schemes for adjusting the clarity of the target image to allow the user to be intuitively aware how unclear the target image is. For example, the electronic device 401 may render the second image more unclear as the difference between the first distance and the second distance increases.

Figure 22:
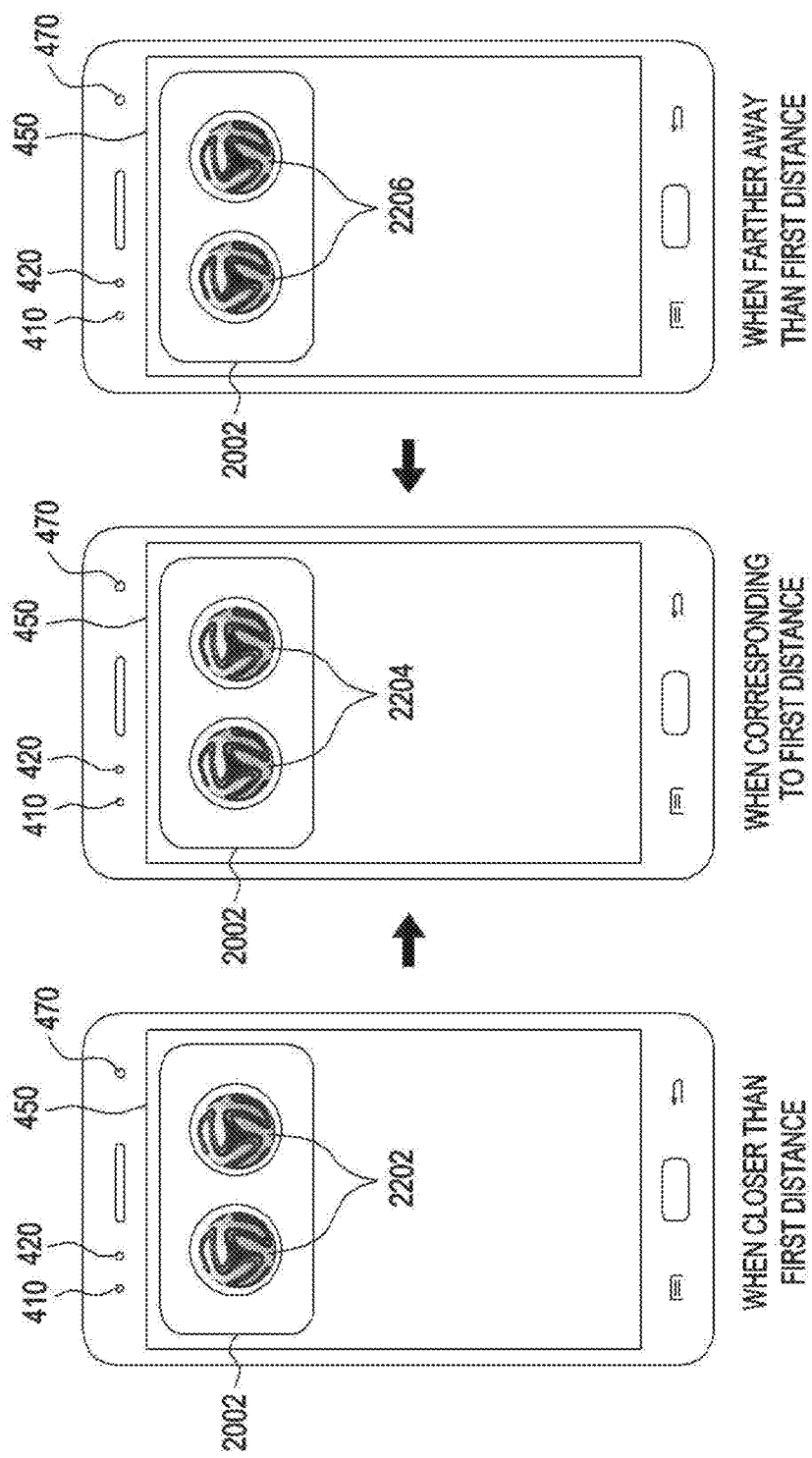

Referring to FIG. 22, the electronic device 401, when the iris recognition process is activated, may display a guide image 2002 where a captured eye is to be positioned on the display 450 and may display a first image 2204 corresponding to the eye 850 on the display 450. The user may move the electronic device 401 or his face so that the first image 2204 is placed in the position where the eye is to be positioned in the guide image 2002.

When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 2202 obtained by rendering the first image 2204 transparent according to the second distance to make a difference between the first distance and the second distance. When the second distance is larger than the first distance, the electronic device 401 may display, on the display 450, the second image 2206 obtained by rendering the first image 2204 transparent according to the first distance and the second distance. For example, the electronic device 401 may render the second image more transparent as the difference between the first distance and the second distance increases.

Figure 23:
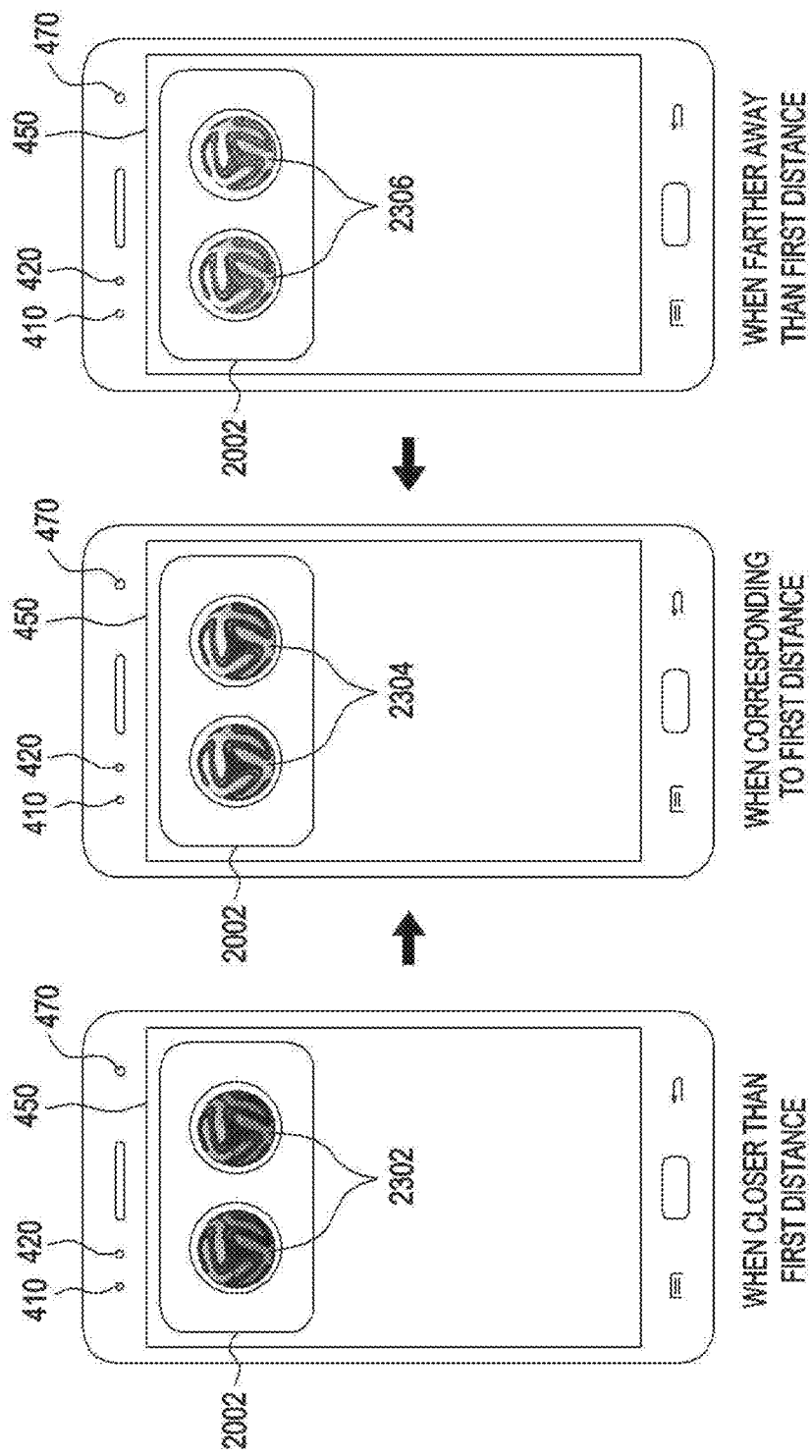

Referring to FIG. 23, the electronic device 401, when the iris recognition process is activated, may display a guide image 2002 where a captured eye is to be positioned on the display 450 and may display a first image 2304 corresponding to the eye 850 on the display 450. The user may move the electronic device 401 or his face so that the first image 2304 is placed in the position where the eye is to be positioned in the guide image 2002.

When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 2302 obtained by rendering the first image 1104 dark according to the second distance to make a difference between the first distance and the second distance. When the second distance is larger than the first distance, the electronic device 401 may display, on the display 450, the second image 2306 obtained by brightening the first image 1104 according to the second distance to make a difference between the first distance and the second distance. For example, the electronic device 401 may render the second image brighter or darker as the difference between the first distance and the second distance increases.

Figure 24:
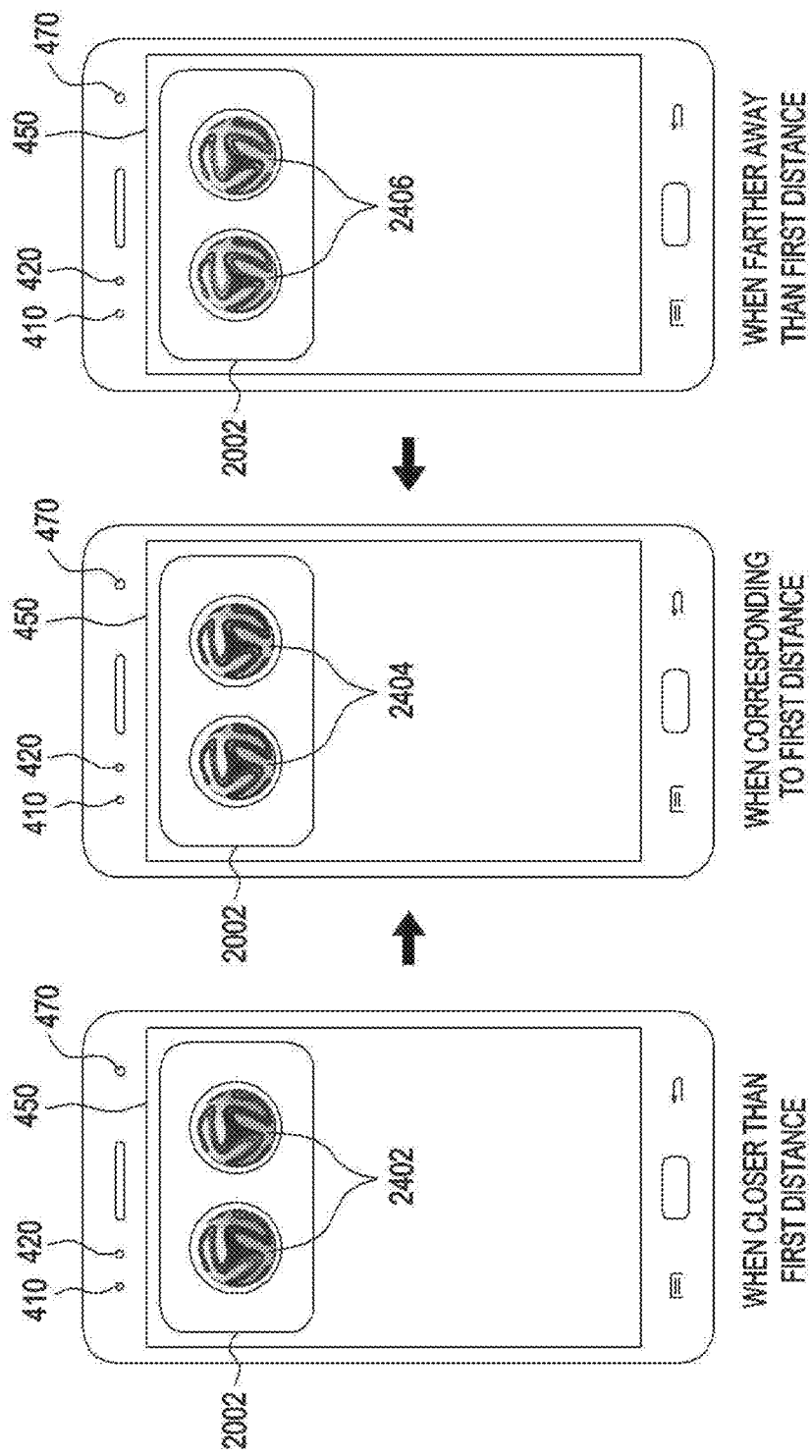

Referring to FIG. 24, the electronic device 401, when the iris recognition process is activated, may display a guide image 2002 where a captured eye is to be positioned on the display 450 and may display a first image 2404 corresponding to the eye 850 on the display 450. The user may move the electronic device 401 or his face so that the first image 2404 is placed in the position where the eye is to be positioned in the guide image 2002.

When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 2402 obtained by changing the color of the first image 1204 from a first color to a second color according to the second distance to make a difference between the first distance and the second distance. When the second distance is larger than the first distance, the electronic device 401 may display, on the display 450, the second image 2406 obtained by changing the color of the first image 1204 from the first color to a third color according to the second distance to make a difference between the first distance and the second distance. For example, the electronic device 401 may perform a process to increase the difference in color of the second image as the difference between the first distance and the second distance increases.

Figure 25:
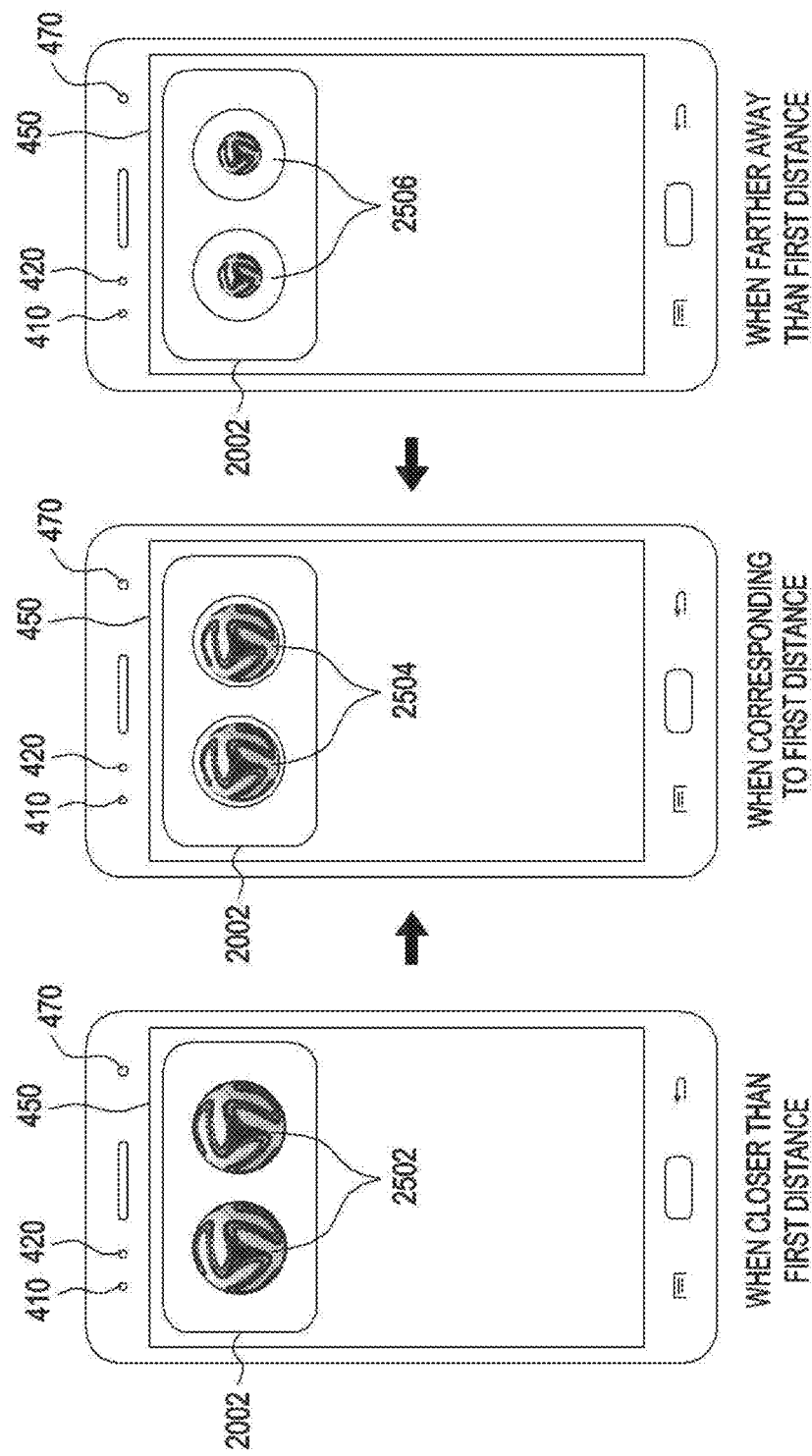

Referring to FIG. 25, the electronic device 401, when the iris recognition process is activated, may display a guide image 2002 where a captured eye is to be positioned on the display 450 and may display a first image 2504 corresponding to the eye 850 on the display 450. The user may move the electronic device 401 or his face so that the first image 2504 is placed in the position where the eye is to be positioned in the guide image 2002.

When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 2502 obtained by enlarging an object in the first image 1304 according to the second distance to make a difference between the first distance and the second distance. When the second distance is larger than the first distance, the electronic device 401 may display, on the display 450, the second image 2506 obtained by shrinking the object in the first image 2504 according to the second distance to make a difference between the first distance and the second distance. For example, the electronic device 401 may perform a process to increase the difference in the size of the object between the first image and the second image as the difference between the first distance and the second distance increases.

Figure 26:
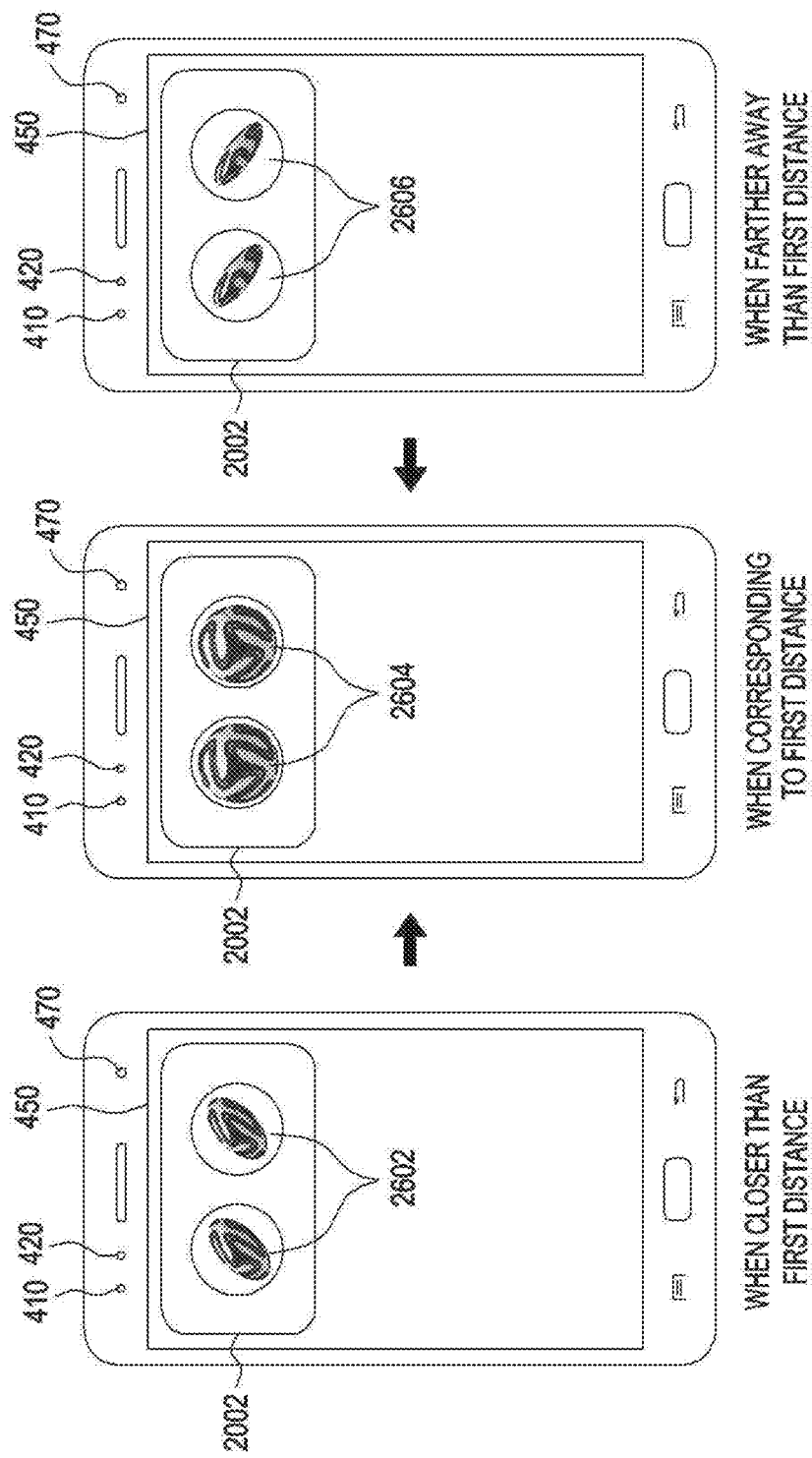

Referring to FIG. 26, the electronic device 401, when the iris recognition process is activated, may display a guide image 2002 where a captured eye is to be positioned on the display 450 and may display a first image 2604 corresponding to the eye 850 on the display 450. The user may move the electronic device 401 or his face so that the first image 2604 is placed in the position where the eye is to be positioned in the guide image 2002.

When the second distance (e.g., the distance between the IR camera 410 and the eye 850) is smaller than the first distance (e.g., the iris-recognizable distance between the eye 850 and the IR camera 410), the electronic device 401 may display, on the display 450, a second image 2602 obtained by transforming an object in the first image 2604 into a first shape according to the second distance to make a difference between the first distance and the second distance. When the second distance is larger than the first distance, the electronic device 401 may display, on the display 450, the second image 2606 obtained by transforming the object in the first image 1404 into a second shape according to the second distance to make a difference between the first distance and the second distance. For example, the electronic device 401 may perform a process to increase the difference in the shape of the object between the first image and the second image as the difference between the first distance and the second distance increases.

Figure 27:
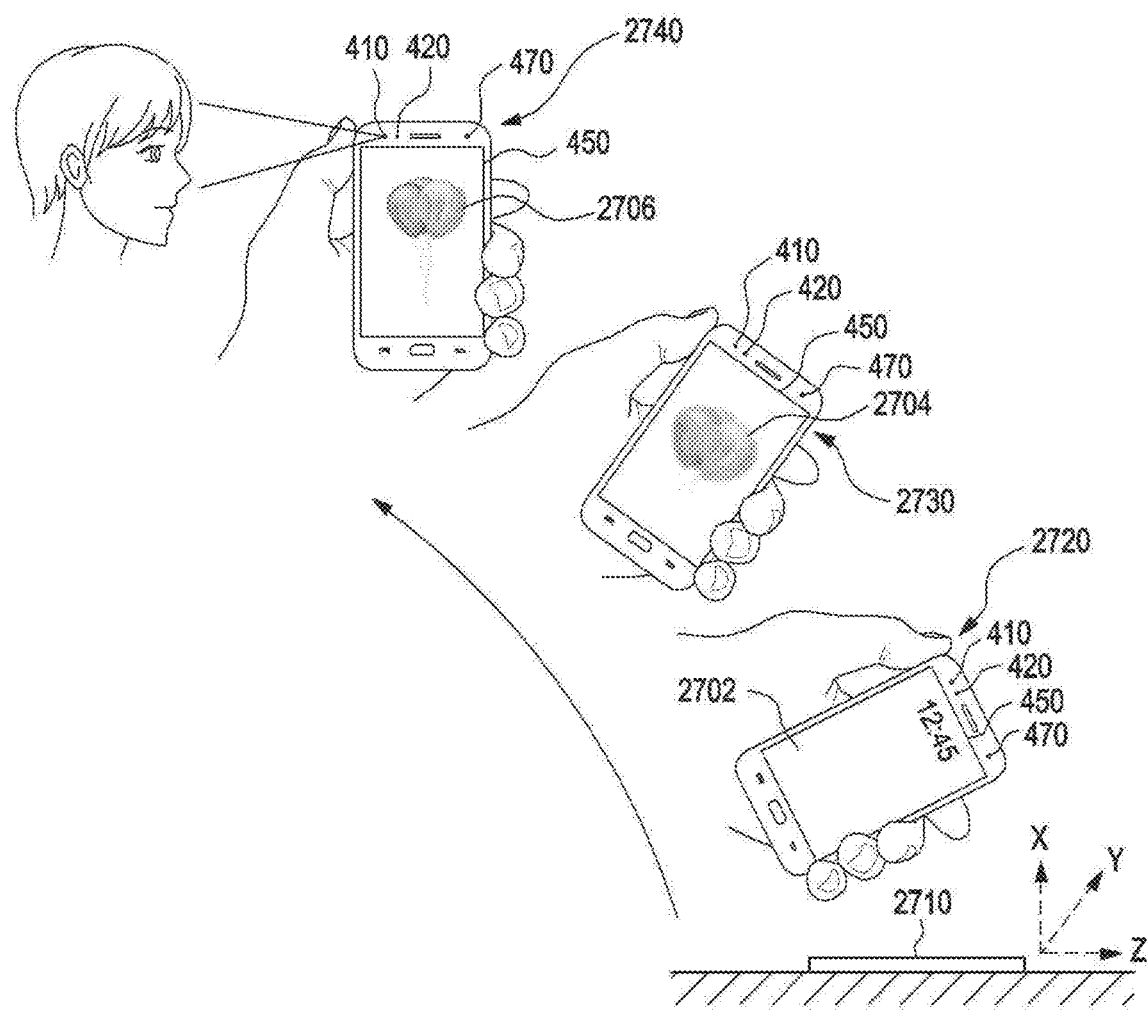
FIG. 27 illustrates a view of an iris recognition operation according to an embodiment of the present disclosure.

FIG. 27 is a view illustrating an iris recognition operation according to an embodiment of the present disclosure.

Referring to FIG. 27, the electronic device 401 may be placed on the floor in a locked state (2710). Placed on the floor in the locked state, the electronic device 401 may display a lock screen 2702.

According to an embodiment of the present disclosure, when the electronic device 401 is lifted up by the user in the locked state (2720), the electronic device 401 may activate the iris recognition process for unlocking. For example, the electronic device 401 may determine the motion pattern of the electronic device 401 using a sensor value measured by the acceleration sensor 434 and determine whether the motion pattern is such that it is lifted off the floor by the user. When the motion pattern is such that it is lifted up off the floor by the user, the electronic device 401 may generate a pick-up event to activate the iris recognition process for unlocking and provide the generated pick-up event to an unlocking application. The unlocking application may activate the iris recognition process to release the unlock screen according to the generated pick-up event.

According to an embodiment of the present disclosure, the electronic device 401 may obtain position value information about the electronic device 401 as the iris recognition process is activated. Variations in three axes (X, Y, and Z axis) with respect to, e.g., the state in which the electronic device 401 is horizontally placed on the floor may be sensed. The position value information may be determined from the sensed variations. The electronic device 401 may compare a first state (a state highly likely to be iris-recognizable) in which the processor 460 stands upright with a current second state of the electronic device 401 using the position value information. The electronic device 401 may compare the first state with the second state and display an image for iris recognition based on the size of difference in position of the electronic device 401 as per the first state and the second state. The electronic device 401 may stepwise set the size of difference in position of the electronic device 401 from smaller to larger according to the first state and the second state. When no difference is present between the first state and the second state, the image may be a first image. The electronic device 401 may change the first image to a second image, which differs from the first image, depending on the size of difference in position between the first state and second state.

According to an embodiment of the present disclosure, the electronic device 401 may change the first image to the second image different from the first image, step by step, from smaller in the size of position difference to larger. The second image may be an image associated with the first image. The second image may be an image obtained by varying at least one or more of the shape, sharpness, transparency, brightness, color, or object size of the first image to make a difference between the first state and the second state. The memory 440 may store a plurality of different second images stepwise as per the size of position difference.

When there is a difference in position of the electronic device 401 according to the first state and the second state (2730), the electronic device 401 may display, on the display 450, the second image 2074 changed from the first image to be different from the first image depending on the size of difference between the first state and the second state.

When there is no difference in position of the electronic device 401 according to the first state and the second state (2740), the electronic device 401 may display the first image 2076 on the display 450 and perform iris recognition. The electronic device 401, after performing iris recognition, may perform authentication as to whether the recognized iris is the user's or not. When the iris recognition succeeds, the electronic device 401 may perform unlocking and display a home screen or designated screen on the display 450.

Each of the aforementioned components of the electronic device may include one or more parts, and a name of the part may vary with a type of the electronic device. According to an embodiment of the present disclosure, the electronic device may be configured to include at least one of the above-described components, and may exclude some of the components or may include other additional components. Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module as used herein may include at least one of Application Specific Integrated Circuit (ASIC) chips, Field Programmable Gate Arrays (FPGAs), or Programmable Logic Arrays (PLAs) that perform some operations, which have already been known or will be developed in the future.

Various embodiments of the present disclosure may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer). The storage unit that may be included in the electronic device may be an example of a storage medium that may be read out by a machine appropriate to store a program or programs including instructions for realizing the embodiments of the present disclosure. Accordingly, various embodiments of the present disclosure encompass a program containing codes for implementing the device or method set forth in the claims of this disclosure and a machine-readable storage medium storing the program. The program may be electronically transferred via any media such as communication signals transmitted through a wired or wireless connection and the present disclosure properly includes the equivalents thereof. According to an embodiment of the present disclosure, there is provided a storage medium storing a program, wherein the program may display a first image on a display when a distance between an electronic device and an object included in an image captured by a camera is a first distance in the electronic device and display a second image associated with the first image on the display when the distance between the electronic device and the object included in the image captured by the camera is a second distance different from the first distance.

The electronic device may receive the program from a program providing device wiredly or wirelessly connected thereto and store the same. The program providing device may include a memory for storing a program including instructions for performing a method for conducting iris recognition using a display of an electronic device and information necessary for the method for performing iris recognition using the display of the electronic device, a communication unit for performing wired or wireless communication with the electronic device, and a processor transmitting the program to the electronic device automatically or at a request from the electronic device.

As is apparent from the foregoing description, according to an embodiment of the present disclosure, iris recognition may be guided using an image corresponding to the user's eye or iris even without steadily displaying the user's face or eye on the preview screen, preventing the user's eye or iris information from leaking out while presenting aesthetic effects.

According to an embodiment of the present disclosure, a second image may be provided where a first image corresponding to an eye in an image has been image-processed to recognize a distance appropriate for iris recognition instead of providing a text feedback message and preview screen. Thus, the user may intuitively recognize the distance appropriate for iris recognition and quickly position the eye to an iris-recognizable distance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
    a camera;
    a display;
    a memory storing an iris image and a plurality of images; and
    a processor configured to:
        select an image for representing eyes from the memory;
        activate an iris recognition function;
        in response to activating the iris recognition function, control the camera to capture an eye image;
        identify an eye included in the eye image captured by the camera;
        identify a first image corresponding to a first distance among the plurality of images when a distance between the eye and the electronic device is the first distance;
        control the display to display the first image, the first image being different from the eye included in the eye image, when the distance between the electronic device and the eye is a first distance;
        identify a second image corresponding to a second distance among the plurality of images when the distance between the eye and the electronic device is the second distance;
        change the first image into the second image obtained by differently processing at least one or more of a shape, clarity, transparency, brightness, color, or object size of the first image and control the display to display the second image associated with the first image when the distance between the electronic device and the eye is a second distance different from the first distance; and
        perform authentication using the iris image and the eye included in the eye image when the distance between the electronic device and the eye included in the eye image captured by the camera is a distance within an iris-recognizable range.

2. The electronic device of claim 1, wherein the first image indicates a first object, the second image indicates the first object, and at least one of a shape, clarity, transparency, brightness, color, and/or object size of the first object of the first image is different from that of the second image.

3. The electronic device of claim 1, further comprising an acceleration sensor sensing a shake of the electronic device, wherein the processor is configured to perform a process to provide an effect corresponding to the sensed shake to the second image corresponding to the sensed shake and to display a third image processed to present the effect corresponding to the sensed shake,
    wherein the processor is configured to sense a motion of the electronic device using the acceleration sensor, perform a process to provide an effect corresponding to the sensed motion to the second image corresponding to the sensed motion, and display a fifth image processed to present the effect corresponding to the sensed motion.

4. The electronic device of claim 1, further comprising an illuminance sensor sensing an illuminance, wherein the processor is configured to perform a process to provide an effect corresponding to the sensed illuminance to the second image corresponding to the sensed illuminance and to display a fourth image processed to present the effect corresponding to the sensed illuminance.

5. The electronic device of claim 1, wherein when iris recognition is requested, the processor is configured to further display a guide image for guiding where a captured eye is to be positioned on the display.

6. The electronic device of claim 1, wherein the processor is configured to determine an age of an object obtained by the camera and display the first image and the second image based on a result of the determination, wherein the processor is configured to reduce a strength or time of infrared (IR) light emission of the camera when the age of the object corresponds to a kid's mode.

7. A method for displaying an image for iris recognition in an electronic device, the method comprising:
    selecting an image for representing eyes from a memory of the electronic device;
    activating an iris recognition function;
    in response to activating the iris recognition function, capturing an image using a camera;
    identifying an eye included in the image captured by the camera;
    identifying a first image corresponding to a first distance among a plurality of pre-stored images when a distance between the eye and the electronic device is the first distance;
    displaying the first image, the first image being different from the eye included in the image, when the distance between the electronic device and the eye included in the image captured by a camera is a first distance;
    identifying a second image corresponding to a second distance among the plurality of pre-stored images when the distance between the eye and the electronic device is the second distance;
    changing the first image into the second image obtained by differently processing at least one or more of a shape, clarity, transparency, brightness, color, or object size of the first image and displaying the second image associated with the first image when the distance between the electronic device and the eye is the second distance different from the first distance; and
    performing authentication using an iris image and the eye included in the image captured by the camera when the distance between the electronic device and the eye included in the image captured by the camera is a distance within an iris-recognizable range.

8. The method of claim 7, wherein the first image indicates a first object, the second image indicates the first object, and at least one of a shape, clarity, transparency, brightness, color, and/or object size of the first object of the first image is different from that of the second image.

9. The method of claim 7, further comprising:
    sensing a shake, an illuminance, and a motion of the electronic device,
    performing a process to provide an effect corresponding to the sensed shake to the second image corresponding to the sensed shake and displaying a third image processed to present the effect corresponding to the sensed shake,
    performing a process to provide an effect corresponding to the sensed illuminance to the second image corresponding to the sensed illuminance and displaying a fourth image processed to present the effect corresponding to the sensed illuminance,
    performing a process to provide an effect corresponding to the sensed motion to the second image corresponding to the sensed motion and displaying a fifth image processed to present the effect corresponding to the sensed motion.

10. The method of claim 7, further comprising displaying a guide image for guiding where a captured eye is to be positioned on the display.

11. The method of claim 7, further comprising:
determining an age of an object obtained by the camera;
performing control to display the first image and the second image based on a result of the determination; and
reducing a strength or time of infrared (IR) light emission of the camera when the age of the object corresponds to a kid's mode.

12. A non-transitory computer readable medium including a program that, when executed by at least one processor, is configured to cause the at least one processor to:
select an image for representing eyes from a memory;
activate an iris recognition function;
in response to activating the iris recognition function, capture an image using a camera;
identify an eye included in the image captured by the camera;
identify a first image corresponding to a first distance among a plurality of pre-stored images when a distance between the eye and an electronic device is the first distance;
display the first image, the first image being different from the eye included in the image, when the distance between the electronic device and the eye included in an image captured by a camera is a first distance in the electronic device;
identify a second image corresponding to a second distance among the plurality of pre-stored images when the distance between the eye and the electronic device is the second distance;
change the first image into the second image obtained by differently processing at least one or more of a shape, clarity, transparency, brightness, color, or object size of the first image and display the second image associated with the first image when the distance between the electronic device and the eye is the second distance different from the first distance; and
perform authentication using an iris image and the eye included in the image captured by the camera when the distance between the electronic device and the eye included in the image captured by the camera is a distance within an iris-recognizable range.

* * * * *